US009495702B2

(12) United States Patent
Srivastava et al.

(10) Patent No.: US 9,495,702 B2
(45) Date of Patent: Nov. 15, 2016

(54) DYNAMIC AUCTION MONITOR WITH GRAPHIC INTERPRETIVE DATA CHANGE INDICATORS

(75) Inventors: Manish Srivastava, Cary, NC (US); German Bertot, Foster City, CA (US); Matthew Sherman, Pleasanton, CA (US); Ramesh Kumar Reddy Jooturu Chinna, Andhra Pradesh (IN); Gyanesh Hari Dwivedi, Foster City, CA (US); John Zhou, Emeryville, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/237,853

(22) Filed: Sep. 20, 2011

(65) Prior Publication Data

US 2013/0073409 A1 Mar. 21, 2013

(51) Int. Cl.

*G06Q 30/00* (2012.01)
*G06F 17/30* (2006.01)
*G06Q 30/08* (2012.01)

(52) U.S. Cl.

CPC .................................... *G06Q 30/08* (2013.01)

(58) Field of Classification Search

CPC ...................................................... G06Q 30/08
USPC ................................................ 705/26.3, 26.8
See application file for complete search history.

(56) References Cited

U.S. PATENT DOCUMENTS 5,185,816 A * 2/1993 Takatori et al. .............. 382/160
6,113,539 A * 9/2000 Ridenour ............ A61B 5/0002 128/903
7,379,064 B2 5/2008 Raffel et al.
7,533,051 B2 5/2009 Powell et al.
7,870,037 B2 1/2011 Stephens et al.
2005/0120051 A1 6/2005 Danner et al.
2005/0216846 A1 9/2005 Kalenius
2006/0089939 A1 4/2006 Broda et al.

(Continued)

OTHER PUBLICATIONS

Dees, T. (2000). Understanding online auction fraud. Law & Order, 48(12), 85-89. Retrieved from http://search.proquest.com/docview/197214341?accountid=14753.*

(Continued)

*Primary Examiner* — Kathleen Palavecino

(74) *Attorney, Agent, or Firm* — Vista IP Law Group, LLP; Peter C. Mei

(57) ABSTRACT

A method, system, and computer program product for updating an auction monitor display with highlighting or emphasis in the form of graphic data change indicators. The method commences by capturing a first set of auction variables, the auction variables pertaining to an ecommerce auction involving a plurality of auction participants in the ecommerce auction. Then, for ongoing real-time display, the method introduces a delay of a variable duration of time, the variable duration of time based on the length of time before the end of the auction. At various points within each delay period, the method captures a second set of auction variables which are compared to the first set of auction variables to identify a candidate set of changed auction variables for emphasis. The determination of the manner of emphasis is based on the changed auction variable and characteristics of the type of change of the changed auction variable.

17 Claims, 18 Drawing Sheets

(56) References Cited

U.S. PATENT DOCUMENTS

| | | | | |
|---|---|---|---|---|
| 2007/0008099 | A1* | 1/2007 | Kimmel | A62C 99/00 340/506 |
| 2007/0033185 | A1 | 2/2007 | Maag | |
| 2007/0038516 | A1* | 2/2007 | Apple et al. | 705/14 |
| 2007/0124275 | A1 | 5/2007 | Mishra | |
| 2007/0156718 | A1 | 7/2007 | Hossfeld et al. | |
| 2007/0211056 | A1 | 9/2007 | Chakraborty et al. | |
| 2008/0043256 | A1 | 2/2008 | Broda et al. | |
| 2008/0046469 | A1* | 2/2008 | Ikeguchi et al. | 707/104.1 |
| 2008/0046556 | A1 | 2/2008 | Nicholls et al. | |
| 2008/0126265 | A1* | 5/2008 | Livesay et al. | 705/80 |
| 2008/0177839 | A1 | 7/2008 | Chang et al. | |
| 2008/0221949 | A1 | 9/2008 | Delurgio | |
| 2008/0250058 | A1 | 10/2008 | Zadorozhny | |
| 2009/0037314 | A1* | 2/2009 | Powell et al. | 705/37 |
| 2009/0150319 | A1 | 6/2009 | Matson et al. | |
| 2009/0319312 | A1* | 12/2009 | Moerdler et al. | 705/7 |
| 2010/0023496 | A1 | 1/2010 | Mohan | |
| 2011/0270701 | A1* | 11/2011 | Black et al. | 705/26.3 |
| 2012/0150693 | A1* | 6/2012 | Dueck et al. | 705/26.81 |
| 2012/0290527 | A1 | 11/2012 | Yalamanchilli | |
| 2013/0246230 | A1 | 9/2013 | You | |

OTHER PUBLICATIONS

Non-Final Office Action for U.S. Appl. No. 13/237,865, dated Jul. 30, 2013.

Final Office Action dated Feb. 10, 2014 for U.S. Appl. No. 13/237,865.

Non-Final Office Action dated Jul. 3, 2014 for U.S. Appl. No. 13/237,865.

Final Office Action dated Dec. 17, 2015 for related U.S. Appl. No. 13/237,865.

Advisory Action dated Mar. 28, 2016 for related U.S. Appl. No. 13/237,865.

Non-Final Office Action dated Jun. 3, 2015 for U.S. Appl. No. 13/237,865.

Non-final Office Action dated Oct. 5, 2016 for related U.S. Appl. No. 13/237,865.

* cited by examiner

Figure 4

400

| Variable Name | Refresh Class | Exemplary Representation |
| --- | --- | --- |
| Auction Identifier | Static | A string such as “Auction #37522” |
| Supplier Identifier | Time-invariant | A string such as “CV_SuppA01” |
| Line1 Description | Time-invariant | A string such as “PC - Desktop” |
| Line1 Price | Time-variant (TV) | A currency value |
| Line2 Price | Time-variant (TV) | A currency value |
| Line1 Price Change | Time-variant (TV) | A currency value |
| Line1 Price Change % | Calculated time variant | A percentage |

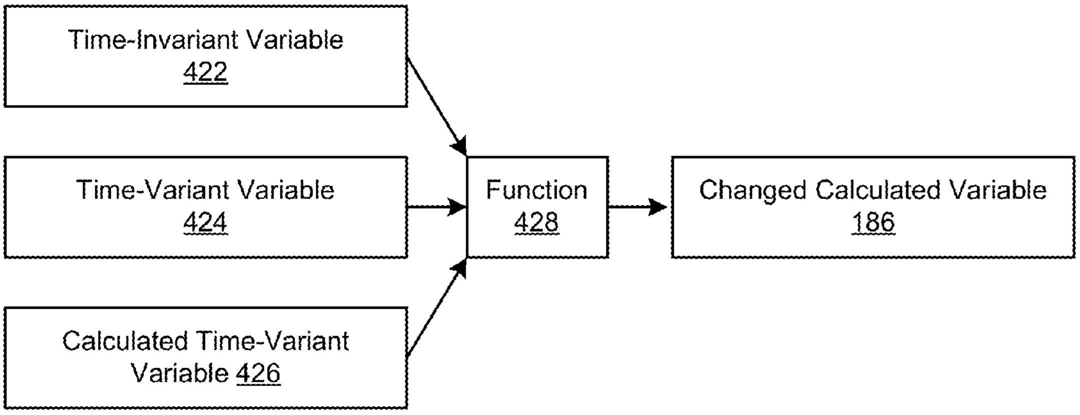

802 804 806

| Variance From Prior Response ? | Savings (%) | Time of Response | Last Activity | Last Activity Date | Online Status |
|---|---|---|---|---|---|
| | | | Create response | 8/13/11 1:17 AM | |
| 29,150.00 | -0.99 | 8/13/11 12:56 AM | Analysis | 8/13/11 12:49 AM | |
| | -1.00 | 8/13/11 12:56 AM | Analysis | 8/13/11 12:56 AM | |
| | | | | | |
| | | | View negotiation | 8/13/11 12:59 AM | |

| Variance From Prior Response ? | Savings (%) | Time of Response | Last Activity | Last Activity Date | Online Status |
|---|---|---|---|---|---|
| | 0.19 | 8/13/11 1:28 AM | Analysis | 8/13/11 1:28 AM | |
| 26,500.00 | -0.19 | 8/13/11 1:28 AM | Analysis | 8/13/11 12:49 AM | |
| 13,500.00 | -0.60 | 8/13/11 1:28 AM | Analysis | 8/13/11 12:56 AM | |
| | | | View negotiation | 8/13/11 12:59 AM | |
| | | | | | |
| | | | Creat response | 8/13/11 1:17 AM | |

| Rank | Response Price | Response Quality (Each) | Response Line Amount | Variance From Prior Response? | Promised Date | Time of Response |
|---|---|---|---|---|---|---|
| 1 | ⇩759.00 | 2,650 | ⇩2,011,350.00 | -2,010,581.00 | 9/1/11 | 8/13/11 1:28 AM |
| 2 | 760.00 | 2,650 | 2,014,000.00 | | 9/1/11 | 8/13/11 1:28 AM |
| ⇩3 | 770.00 | 2,650 | 2,040,500.00 | | 9/1/11 | 8/13/11 12:56 AM |
| | | | | | | |
| | | | | | | |
| | | | | | | |

DYNAMIC AUCTION MONITOR WITH GRAPHIC INTERPRETIVE DATA CHANGE INDICATORS

FIELD

The disclosure relates to the field of electronic commerce, and more particularly to user interface facilities for carrying out real-time online auctions.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Procurement organizations often conduct ecommerce auctions to identify the most preferred suppliers for goods and services that the procurement organization is looking to procure. These ecommerce auctions often involve multiple goods and/or service items, and often many suppliers are invited to participate in the auction. In an ecommerce auction, the frequency of bid updates from suppliers tends to increase as the auction nears completion and the bidding gets more and more competitive. Even as the auction nears completion and activity increases, the buyers within the procurement organizations have to keep track of incoming bids from suppliers, determine the impact of new bids, calculate or estimate the effect on the relative rankings between bidding suppliers, calculate or estimate projected savings, and so on.

Based on such fast-changing information, the buyer may be compelled to take necessary actions such as pause the auction, extend the remaining time duration, etc. In fast paced auctions, it becomes very difficult for the buyer to absorb the fast-changing information (e.g., the changes to incoming bids) and assess their impact to the organization and to the supplier selection process. Legacy systems have rudimentary bid monitoring capabilities intended to show data regarding incoming bids. However, legacy systems fall short of aiding the buyer in order to show (e.g., via a highlight or emphasis) the changed bid, and to show (e.g., via a highlight emphasis) the impact of the changed bids. Moreover, towards the close of the auction this information is ever more fast-changing, making it nearly impossible for the user to manually figure out what information had changed and interpret the impact or impacts resulting from the changed information.

Therefore, there is a need for an improved approach involving fast-paced dynamic monitoring of changing data in a real-time online auction using interpretive data change indicators.

SUMMARY

A method, system, and computer program product for updating an auction monitor display with highlighting or emphasis in the form of graphic data change indicators. The method commences by capturing a first set of auction variables, the auction variables pertaining to an ecommerce auction involving sellers participating in the ecommerce auction. Then, for ongoing refresh of the monitor display, the method introduces a delay of a variable duration of time, the variable duration of time based on the length of time before the end of the auction. Additionally, some implementations allow a manual establishment of the refresh interval and/or a forced refresh at any point in time.

At various points within each delay period, the method captures a second set of auction variables which are compared to the first set of auction variables to identify a candidate set of changed auction variables for emphasis. The determination of the manner of emphasis is based on the changed auction variable and characteristics of the type of change affecting the changed auction variable.

Further details of aspects, objects, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 4 illustrates a technique for handing changed calculated variables, according to some embodiments.

DETAILED DESCRIPTION

Embodiments of the present disclosure are directed to an improved dynamic auction monitor with graphic interpretive data change indicators.

Introduction

As earlier indicated, legacy systems fall short of aiding the buyer in order to show activity (e.g., bidding activity) during the course of an auction. Additionally, legacy systems fall short of aiding the buyer in order to assess the impact of changed bids or other bidding activity. Moreover, towards the close of the auction this information is ever more fast-changing, and users need computer-aided support to figure out what information changed and computer-aided support to interpret the impact resulting from the changes. The system and methods disclosed herein provide dynamic bid monitoring screens that automatically display information about incoming bids. The screens are refreshed in real-time at dynamically-updated screen refresh rates, which rates are responsive to (a) manual refresh requests, (b) manual screen refresh rate requests, and/or (c) refresh rates determined by the progression of the auction toward a scheduled completion time (or any combination thereof). Also, as new bids come in, the system graphically highlights changes compared to prior bids and interprets the positive or negative impact brought about by said changes. Bids that have changed between screen refreshes are highlighted by a change icon or other screen device placed next to the changed bid. The new bid amount and variance from previous bid amount are also displayed, and highlighted (if changed). In some cases an up/down arrow icon is displayed next to the bid amount, which up/down arrow icon serves to indicate the direction of change. In other cases, the color of the arrow (e.g., green, red, etc.) indicates whether the change was favorable or unfavorable. Other auction variables (e.g., overall price, vendor/supplier rankings, projected savings, etc.) are highlighted using up/down and/or green/red arrow icons. In this manner, the attention of the buyer is quickly brought to the existence of and the nature of changed information from one screen refresh to the next.

Figure 1A:
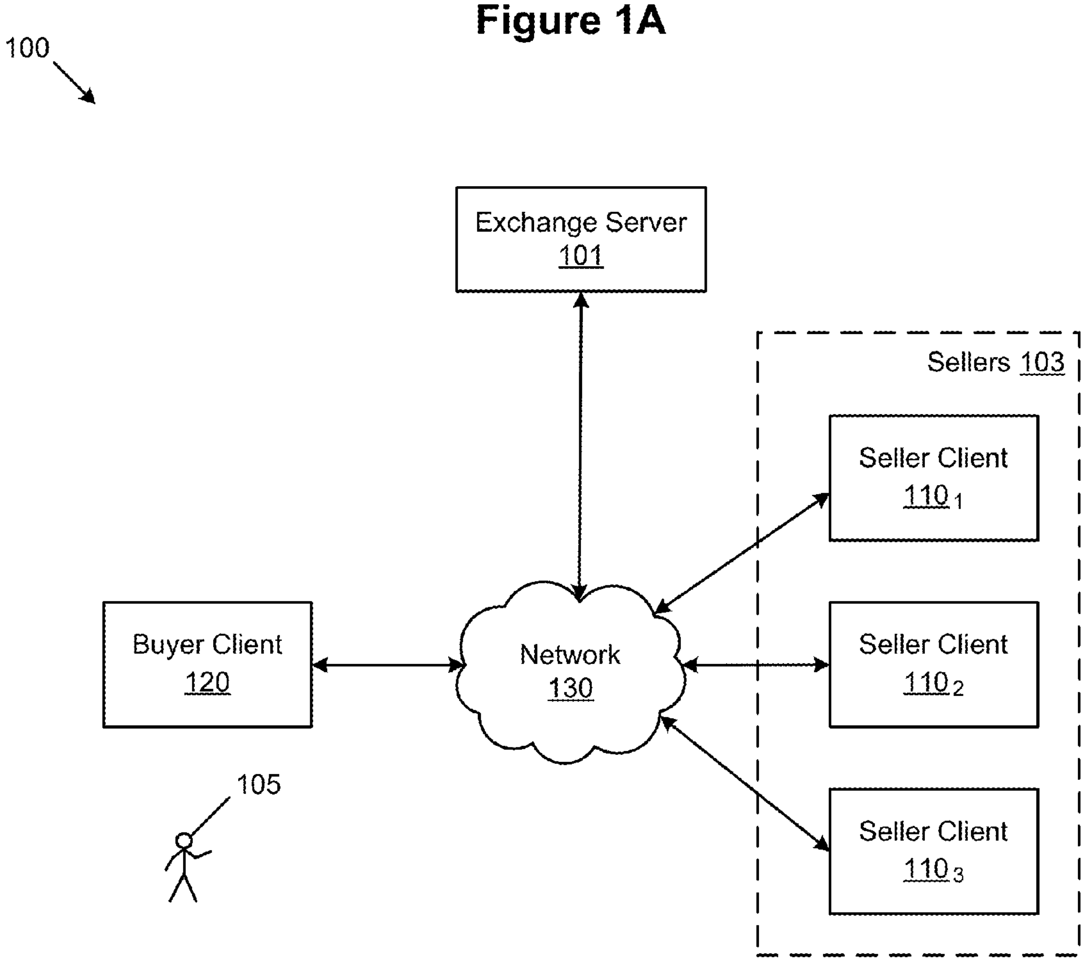
FIG. 1A illustrates an environment for implementing an ecommerce auction, according to some embodiments.

FIG. 1A illustrates an environment 100 for implementing an ecommerce auction, according to some embodiments. A buyer interacts with multiple suppliers (e.g. sellers 103) in an ecommerce auction, with bidding and other ecommerce auction information being communicated over network 130. As shown, a buyer is depicted as a buyer client 120, which buyer client 120 is a computer configured to display auction information using a graphical user interface (e.g., within a browser or within a micro-browser) to a user 105, which user can be a real person, or a computer-implemented agent, or a plurality of users, each user interacting independently, or a plurality of computer-implemented agents, each computer-implemented agent interacting independently. More particularly, in situations with a plurality of independent interactions in independent sessions (e.g. independent browser sessions), various embodiments capture auction variables and user settings on a per-session basis, and displayed change indicators are based on the variables and user settings of the specific session. Still further, in some embodiments, the role of a buyer can be swapped with the role of a seller. In such embodiments, multiple buyers compete to win an action in which the multiple buyers compete for a seller's products or services. In such embodiments, the disclosed techniques serve to capture auction variables pertaining to at least two buyers participating in the biding activities of the ecommerce auction (e.g. in independent browser sessions) in order for one of them to win the right to acquire the seller's offered products or services.

Returning to FIG. 1A as shown, sellers are depicted as seller clients 110, which seller clients 110 are implemented using a computer (e.g., some form of a processor and memory). A supplier can be a manufacturer, or a service provider, or an agent (e.g., an agency, or a real person, or a computer-implemented agent) able to participate in an ecommerce auction.

In exemplary embodiments, the seller clients are configured to submit bids in the ecommerce auction, and the existence and use of the network 130 supports remote bidding. That is, a seller can submit bids (and/or changes to a bid) from a remote location using the network 130 (e.g., a distributed computer network) to submit such bids, which bids are then processed by an exchange server 101 and presented to a buyer (e.g., at a buyer client 120) using a graphical user interface. In this embodiment, the exchange server can receive multiple bids from multiple seller clients, and can interpret and/or forward the changes to a buyer client 120. In some embodiments, the interpretation and/or forwarding of the changes is configured to occur at the exchange server so that it can, in turn, provide changes to a buyer client 120 in accordance with the configuration. The changes provided by exchange server to a buyer client 120 can be provided in the form of changed data, and/or changed data with an indication of the nature of the changes, and/or any portions of a GUI (e.g., graphical screen devices, or parameters) or any combination of changed data representations. In some embodiments, the changed data is interpreted by an exchange server. In other embodiments, the changed data is interpreted by a buyer client 120, and the changed data can be viewed by a user 105, and such viewing can be at least partially controlled by a user 105.

Figure 1B:
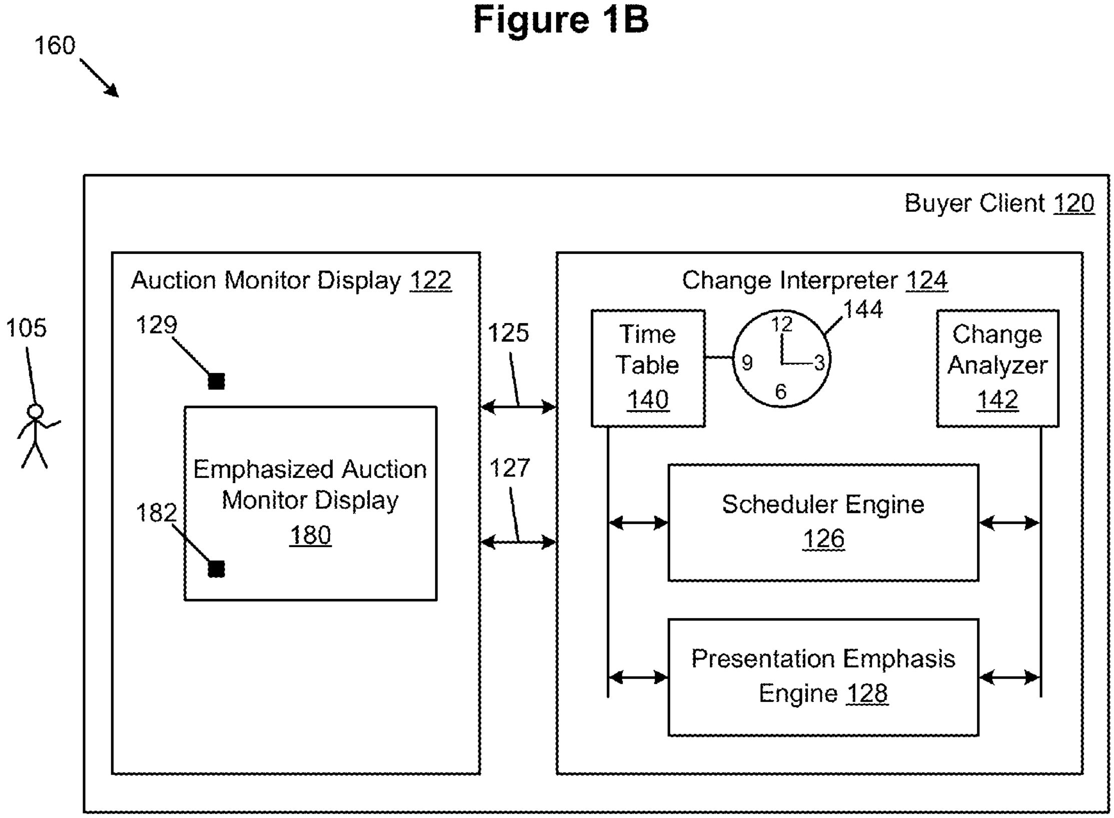
FIG. 1B illustrates a system having a buyer client configured with a change interpreter for emphasizing changes, according to some embodiments.

FIG. 1B illustrates a system 160 having a buyer client 120 configured with a change interpreter 124 for emphasizing changes. As aforementioned, a buyer client can comprise a graphical user interface, and such a graphical user interface can include a portion of the GUI (e.g., an auction monitor display 122) that is configured to interface to a change interpreter 124. As shown, the interfaces between an auction monitor display 122 and a change interpreter 124 can be bidirectional, and includes a data path 125 and a command path 127.

In the embodiment shown, the change interpreter 124 includes a time table 140 for automatically determining the frequency of communications over data path 125 and command path 127, and further includes a change analyzer 142 for determining the nature of the communications over the data path 125 and command path 127.

The embodiments of FIG. 1A and FIG. 1B comprise an environment and a system that provides dynamic updating of information on an auction monitor display 122. The auction monitor display 122 serves to automatically display information about incoming bids, with the information being refreshed in real-time at a rate determined (at least in part) by the time table 140. For example, a time table 140 can specify a screen refresh rate 144 of once per hour when the auction begins, and increase to progressively faster update rates as the end time for the auction approaches.

In exemplary embodiments, a buyer client 120 implemented using an auction monitor display 122 and a change interpreter 124 operates as follows: As any auction variables 129 are displayed (e.g., as a new bid comes in or as a new value of a bid comes in), the system 160 graphically highlights changes compared to prior bids and interprets the positive or negative impact brought about by said changes. For example, bids that had changed between screen refreshes are highlighted by a change icon placed next to the corresponding screen device (e.g., a screen device to display a bid number). The new bid amount and its variance from the previous bid are displayed. As another example, when a bid amount changes, a screen device (e.g., an up/down arrow icon) indicates the direction of change, while the color of the screen device (e.g., green or red) highlights the interpretation as to whether the change was favorable or unfavorable. Similarly, impact to other values are interpreted and displayed with emphasis. For example, a change in a bid (e.g., a change in a per unit bid) would likely impact the price of the total order, and thus the change in price would be highlighted or otherwise emphasized. Other auction-related values that are impacted by a change (e.g., the rankings among multiple bidders, projected savings, etc.) are emphasized by up/down arrow icons and/or green/red arrow icons. In this manner, the attention of the buyer is quickly brought to the changed auction values (e.g., a bid changed by a supplier) as well as to the impacted/changed calculated variables (e.g., percent change, etc.) from one refresh of the screen to next. In some cases, an auction monitor display 122 might be displayed before the auction begins, or before any auction values have changed. In other cases when some auction values had indeed changed, they are highlighted, thus rendering an emphasized auction monitor display 180 with highlighting and/or change indicator graphics and/or other emphasis.

In the embodiment of system 160, the timing and content of any rendering of an emphasized auction monitor display 180 is controlled by a scheduler engine 126, and presentation emphasis engine 128. For example, scheduler engine 126 uses a time table 140 and/or screen refresh rate 144 to determine the timing for the next rendering of a changed auction variable 182, and to determine a change to the frequency of successive renderings. Also, the content of any rendering of an emphasized auction monitor display 180 is controlled the presentation emphasis engine 128. For example, presentation emphasis engine 128 uses a change analyzer 142 to determine the highlighting and/or change indicator graphics and/or other emphasis to be used in a particular rendering.

Figure 1C:
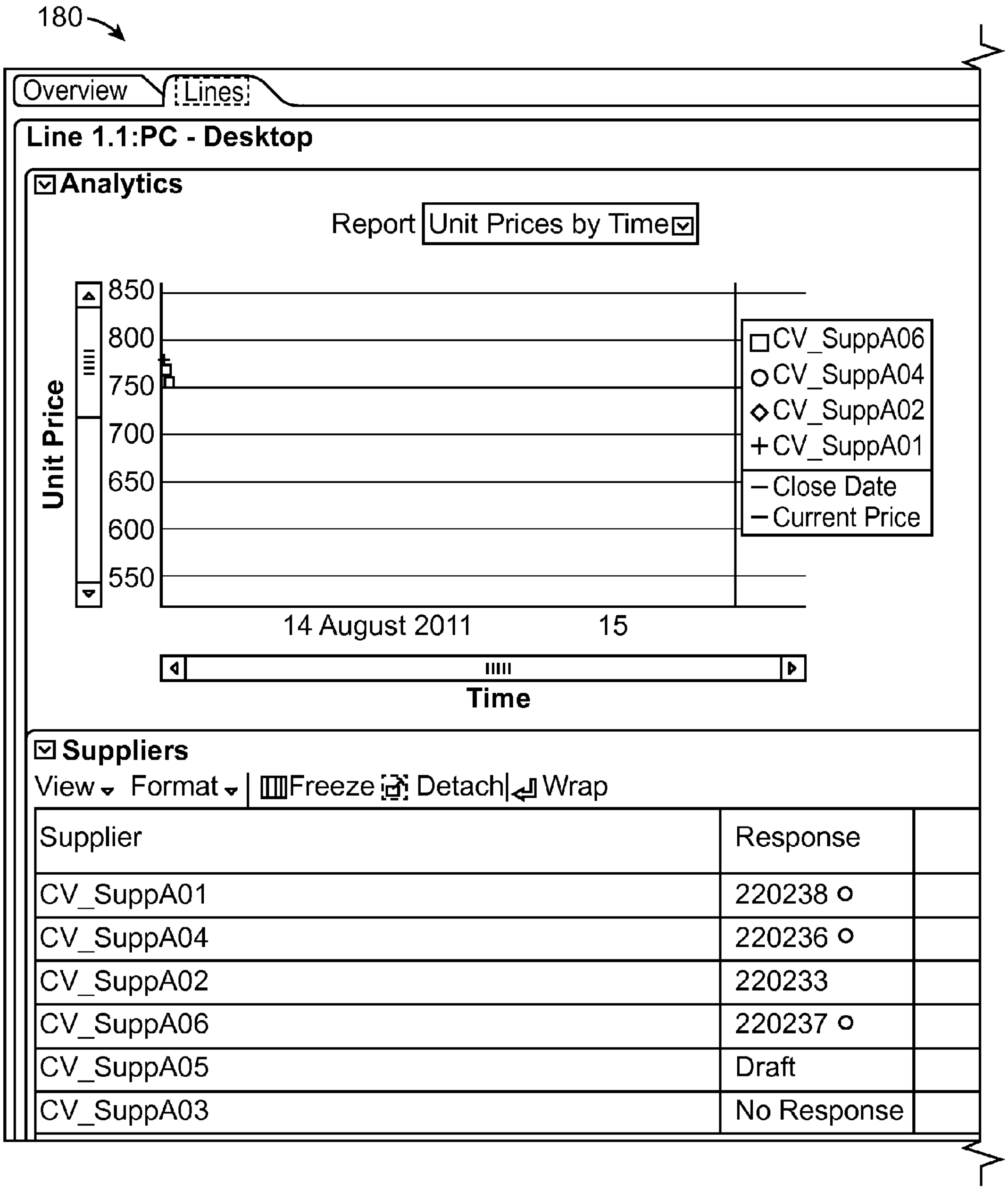
FIG. 1C illustrates an emphasized auction monitor display showing selected areas of emphasis to indicate changed auction data, according to some embodiments.
Figure 1C:
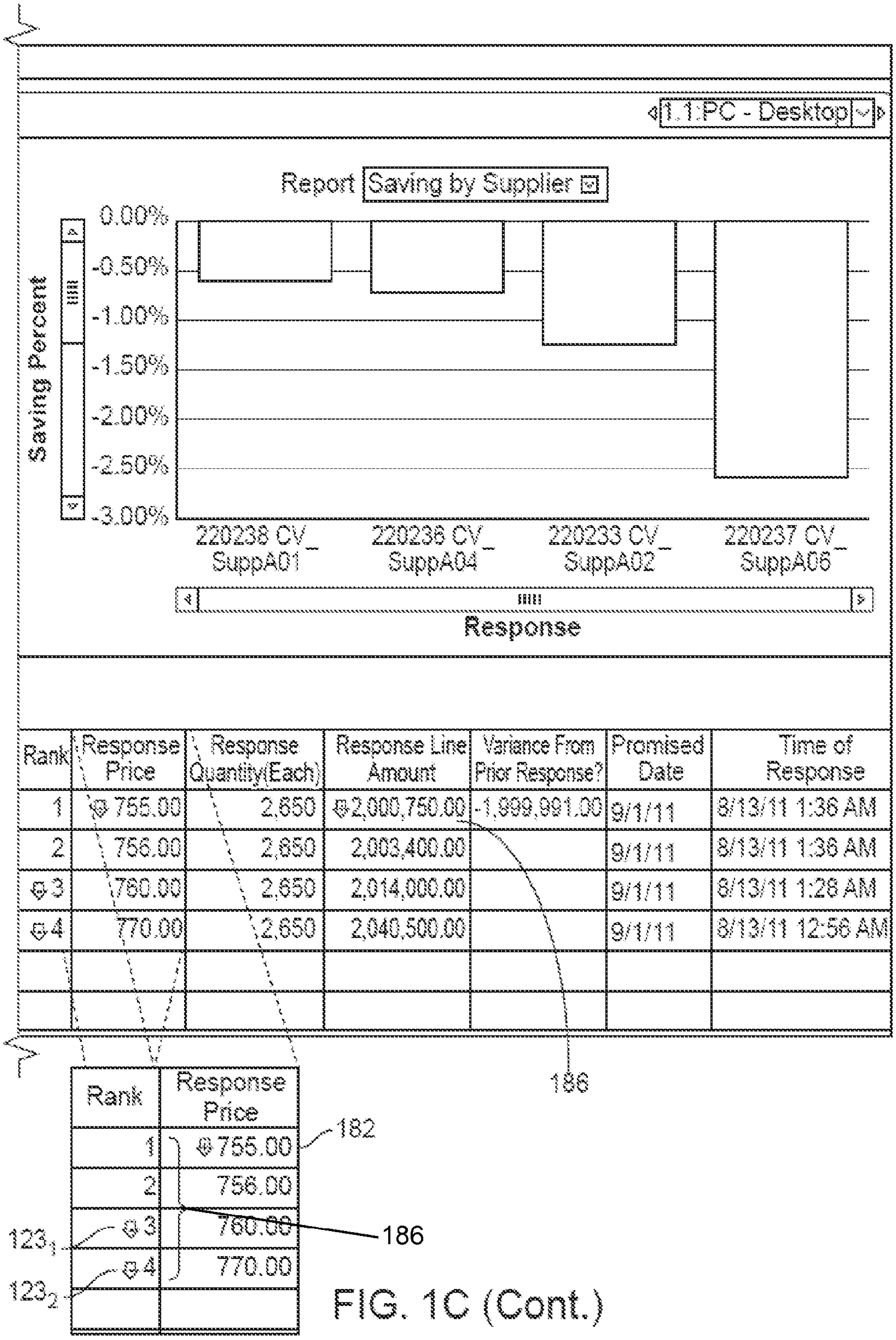

FIG. 1C illustrates an emphasized auction monitor display 180 showing selected areas of emphasis to indicate changed auction data. As heretofore described, as new bids come in, the emphasized auction monitor display 180 is graphically highlighted to visually indicate a changed auction variable 182 (e.g., a changed bid) as compared to a prior value. Additionally, changed calculated variables 186 (e.g., values changed as calculated from changed auction variables) are highlighted by a change icon placed next to the corresponding screen device (e.g., next to the screen display of the changed calculated variables 186). As an example, the emphasized auction monitor display 180 is graphically highlighted using one or more graphic data change indicators 123 (e.g., a change icon, a graphic interpretive data change indicator, etc.) to visually indicate a difference found in a changed calculated variable 186.

As another example, when a bid amount changes, the color of a screen device (e.g., green up arrow or red down arrow) interprets whether the change was favorable or unfavorable. Similarly, impact to other values are interpreted and displayed with highlighting or other emphasis as is appropriate for the particular value and interpretation whether the change was favorable or unfavorable. In this manner the attention of the buyer is quickly brought to the changed auction values (and the impacted/changed calculated variables) from one refresh of the screen to the next.

Figure 2:
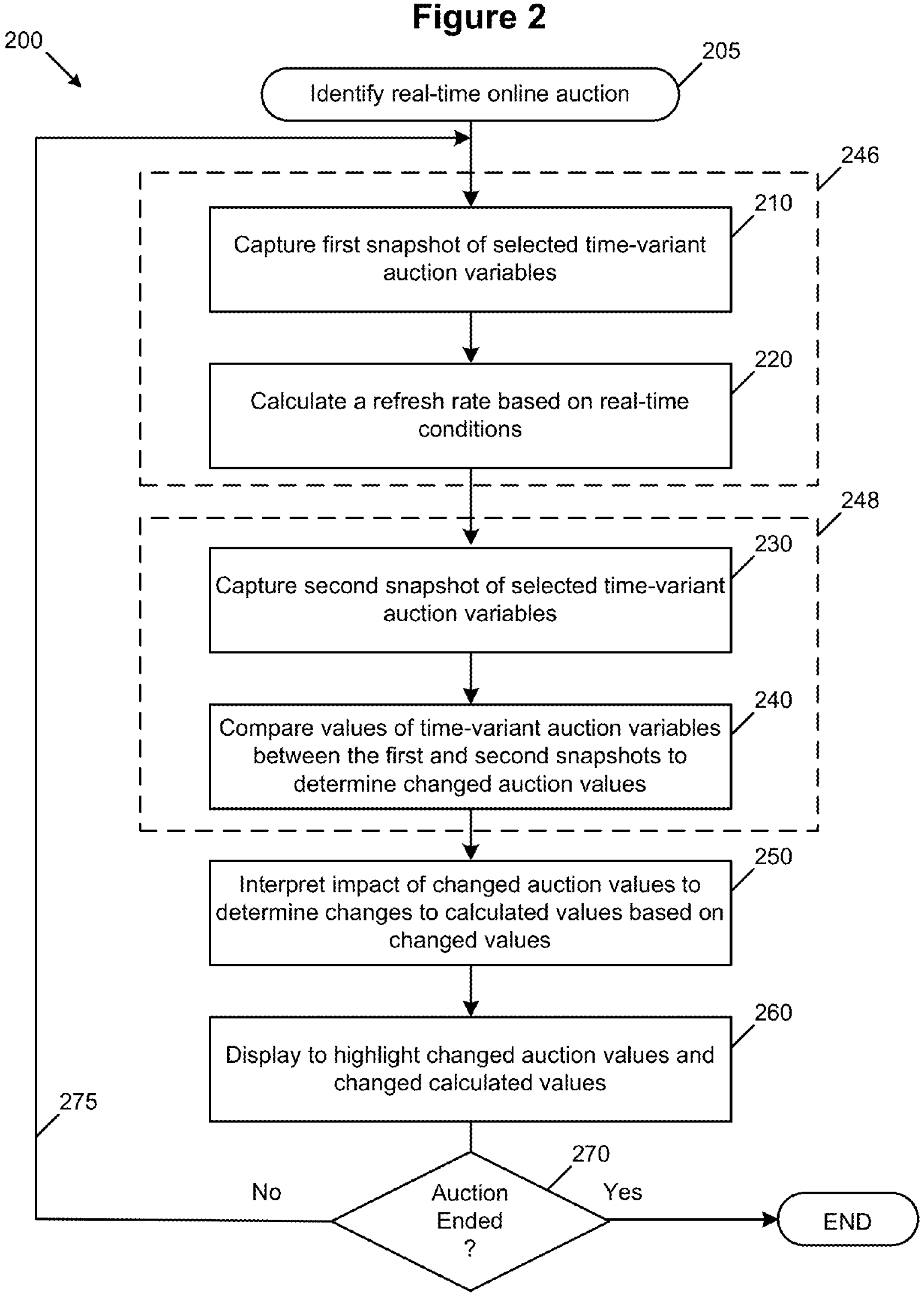
FIG. 2 is a flowchart of a method to implement an auction monitor with graphic interpretive data change indicators, according to some embodiments.

FIG. 2 is a flowchart of a method 200 to implement an auction monitor with graphic interpretive data change indicators, according to some embodiments. As shown, the flow commences upon identification of a particular real-time online auction (see entry point 205). In some environments the exchange server 101 is configured to process a plurality of ecommerce online auctions, and a plurality of sellers can participate in a buyer's auction within an auction ecosystem (e.g., an auction ecosystem within environment 100). Accordingly a group of participants can be associated with a particular real-time action, and such a real-time auction is identified uniquely within an environment 100.

The method of FIG. 2 continues by capturing a snapshot of auction variables (see operation 210). Of course, given a particular real-time action, there can be static variables, time-variant variables, and time-invariant variables. Table 1 gives some description of such variables:

TABLE 1

| Variable Types | | |
|---|---|---|
| Variable Type | Example | Description |
| Static | Auction Identifier | Static variables are initially associated with a given auction, initially assigned a value, and that value persists and is accessible throughout the lifetime of the action. |
| Time-invariant | Supplier Identifier | Time-invariant variables are initially associated with a given auction, initially assigned a value, and that value may be accessible throughout the lifetime of the action. A time-invariant variable may become inaccessible during the course of an action (e.g., if a supplier were to drop out of bidding the process). |
| Time variant (TV) | Bid Amount | Time-invariant variables are initially associated with a given auction, at some point assigned a value, possibly a default value, and that value may be accessible or may become inaccessible during the lifetime of the action. A time-variant variable may change value any number of times during the course of an auction (e.g., if a supplier were change a bid value). |
| Calculated time-variant | Rank | Calculated time-invariant variables are initially associated with a given auction, at some point assigned a value, possibly a default value, and that value may be accessible throughout the lifetime of the action. A calculated time-variant variable may change value any number of times during the course of an action as a result of a change in at least one time-variant variable. |

In exemplary embodiments, the values of time-variant variables are highlighted or emphasized as they change. Accordingly, the operation 210 serves to capture an initial snapshot. In a subsequent step, (see operation 230) a later snapshot is compared to the earlier snapshot, and compared specifically with a purpose to identify changes.

Returning to the earlier discussion regarding the time table 140 and its use to specify a screen refresh rate 144, it is reasonable and envisioned that a default screen refresh rate be established. One possible default refresh rate is given in Table 2.

TABLE 2

Refresh Rate Examples

| Time Remaining in Auction | Default Refresh Rate |
|---|---|
| >24 hours | 1 hour |
| 24 hours-12 hours | 15 minutes |
| 12 hours-3 hours | 10 minutes |
| 3 hours-1 hour | 5 minutes |
| 1 hour-10 minutes | 2 minutes |
| 10 minutes-1 minutes | 30 seconds |
| <1 minute | 6 seconds |

In some embodiments a default refresh rate can be adjusted by a user 105, and/or a refresh can be forced at any point in time. Given the specific values of the refresh rate time table 140, an operation 220 serves to calculate the then current refresh rate based on real-time conditions. For example, if there remains only 9 minutes in the auction, and the auction is not suspended, then the refresh rate might be calculated (referring to Table 2) to be 30 seconds. The operation 210 and operation 220 (and other operations) generally execute many times during the course of an auction (see return path 275); thus, various groups of operations of method 200 might be organized into functions or subroutines (e.g., see subroutine 246, and subroutine 248).

Inasmuch as the techniques disclosed herein serve to implement a dynamic auction monitor with graphic interpretive data change indicators, mechanisms are provided to identify changed data. Accordingly, operation 230 and operation 240 serve to identify changed data for interpretation and emphasized display. Specifically, operation 230 serves to capture a second snapshot of selected time-variant auction variables for comparison with the first snapshot from operation 210. Continuing, the operation 240 serves to compare changed values of the time-variant auction variables. The techniques of operation 230 and operation 240 can be implemented in any environment. For example techniques of operation 230 and operation 240 can be implemented as a function within system 160 (e.g., a function within change analyzer engine 142).

Now, even at this juncture, it is possible to render an emphasized auction monitor display 180 using only the changed auction values as determined in operation 240; however in exemplary embodiments, a user 105 might like to see emphasis at or near the changed calculated variables 186 that were changed during the most recent refresh period. To prepare an emphasized display of changed calculated variables 186, operation 250 serves to interpret the impact that a changed auction variable 182 (e.g., with new value) has on other variables. It is often the case that a change in an auction variable will be reflected in one or more changed calculated variables 186, and those changed calculated variables 186 might be highlighted as described above. The foregoing notwithstanding, it is possible that the specific change of a changed calculated variable 186 or of a changed auction variable may or may not be regarded as sufficient to warrant emphasis in the emphasized auction monitor display 180. For example, it is possible that a small change in a bid (e.g., a few cents) might be calculated, and flowed to the total contract price, yet it is possible that the impact of the small change in the bid might not change the displayed total contract price when the total contract price is displayed in whole dollars. For this and other reasons, embodiments herein use thresholding techniques in the process of comparing auction variables to identify statistically small changes (e.g., below a threshold, below a calculated threshold) in order to remove them from a candidate set of changed auction variables.

On the other hand, certain specific changes (e.g., changes larger than a threshold) of a changed calculated variable 186 or of a changed auction variable may indeed be regarded as sufficient to warrant emphasis, and operation 260 serves to display the changes in the emphasized auction monitor display 180.

The series of operations 210 through operation 260 are repeated until the auction is deemed as ended (see decision 270). Of course any of the operations 210 through operation 260 may retrieve data and perform calculations anew as may be appropriate for the real-time conditions. Just as an example, the operation 260 iteratively selects the refresh rate based on the then-current real-time conditions.

Figure 3:
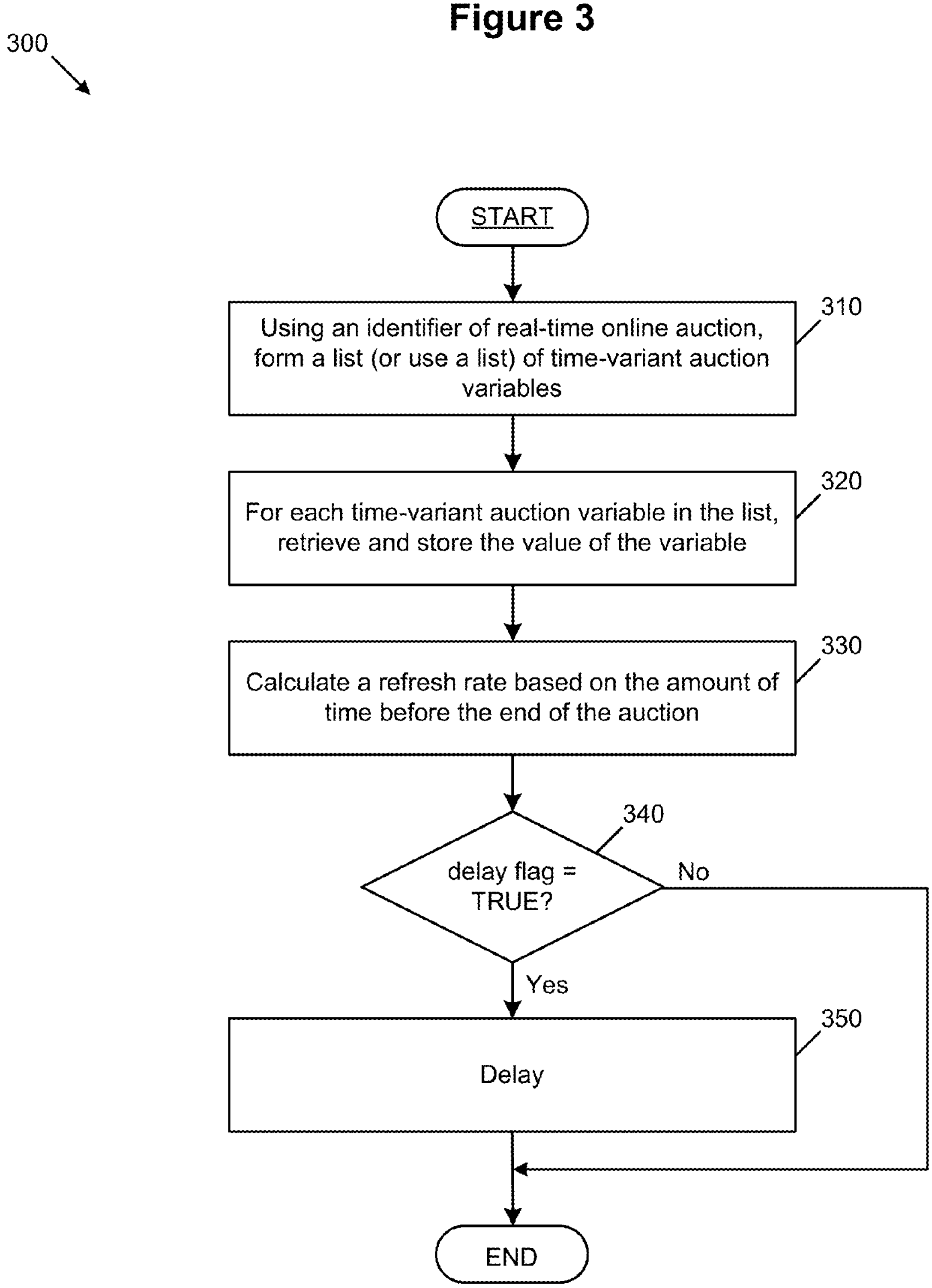
FIG. 3 is a flowchart of a method to implement a subroutine of an auction monitor with graphic interpretive data change indicators, according to some embodiments.

FIG. 3 is a flowchart of a method 300 to implement a subroutine of an auction monitor with graphic interpretive data change indicators, according to some embodiments. As earlier indicated in the discussion of the method 200, operation 210 and operation 220 generally execute many times during the course of an auction (see return path 275); thus, those operations might be organized into a function or subroutine 246. As shown, the method 300 commences at some point after a real-time auction has been identified. And, using the identifier of such a real-time auction, the method retrieves a list of time-variant variables (see operation 310). Alternatively, is possible that no such list exists precisely at the time the auction has been identified, and in such a case, embodiments of operation 310 can form the list. Then, for each time-variant variable in the list, operation 320 serves to retrieve and store the value of the time-variant variables at that moment in time. Such stored values are known collectively as a first snapshot. As shown in FIG. 2 the subroutine 246 can be executed many times during the progression of an real-time auction, thus, there will be many first snapshots (see operation 210) taken for comparison to a second snapshots (see operation 230).

Operation 330 calculates a refresh rate at least partially based on the amount of time before the end of the auction. Such a calculation might use a table such as Table 2, or it might use a table such as Table 2 in conjunction with other variables. Further, a table such as Table 2 might be initially provided as a default table, and might be modified by a user 105. Techniques for handling the variables mentioned in the preceding paragraph that could be used in conjunction with amount of time before the end of the auction include (but are not limited to): (1) calculation of the number of suppliers currently online to predict when new information might be available; (2) calculations including the occurrence of an updated supplier bid to influence the refresh rate; and/or (3) calculations including the occurrence of a new supplier entering the auction to influence the refresh rate, and/or (4) consideration of manually established refresh rate inputs to calculate a refresh rate.

Continuing, and having calculated a refresh rate (see operation 330), the method 300 proceeds to introduce a real-time delay. Such a real-time delay (see decision 340 and operation 350) serves to introduce real-time delay between screen refreshes. It is possible in some situations that the method 300 should complete and return to the caller without introducing a delay, and in such situations, a delay flag can be used to control the introduction of a real-time delay (e.g., such delay as introduced by operation 350), which real-time delay serves to separate the calculation and display of changed time-variant variables and display of changed calculated variables 186.

In exemplary embodiments, a variable duration of time (e.g., a refresh rate) is determined within the time interval between the action of capturing the first set of auction variables (see operation 210) and the action of capturing the second set of auction variables (see operation 230).

FIG. 4 depicts a technique 400 for handling changed calculated variables from other variables, according to some embodiments. As earlier indicated, operation 320 serves to retrieve and store the values of the time-variant variables at a particular moment in time. The stored values of the time-variant variables are then used to calculate various effects of the changed time-variant variables. For example, a price (e.g., "Line 1 Price") might be changed by a supplier (e.g., Supplier "CV_SuppA01"), and the impact of that change in the time variant value may ripple to other values (e.g., calculated time variant values) which in turn might be candidates for highlighting or other emphasizing, as is appropriate for the particular calculated time variant value. Specific types of highlighting or other emphasis can be employed based on the interpretation whether the change was favorable or unfavorable.

As shown, the technique 400 uses a function 428, which function 428 can receive as inputs one or more values in the form of a time-invariant variable 422, a time-variant variable 424, and/or a calculated time-variant variable 426. Execution of the function 428 then results in an output value, the output value being a changed calculated variable 186.

Figure 5:
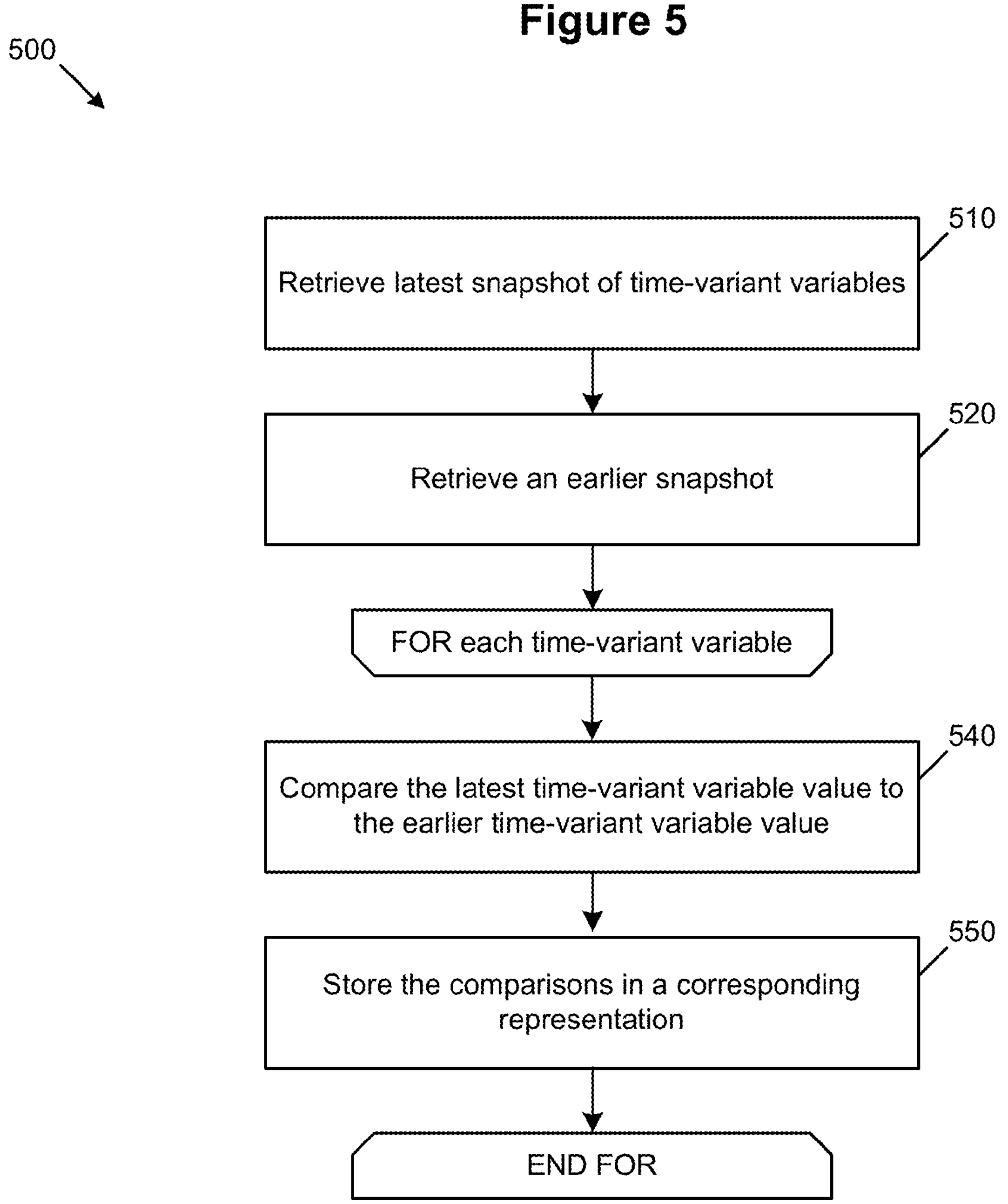
FIG. 5 is a flowchart of operations within a system for handling changed time-variant variables, according to some embodiments.

FIG. 5 is a flowchart of operations within a system 500 for handling changed time-variant variables, according to some embodiments. The operations of FIG. 5 can be used to implement the functions of subroutine 248. As earlier indicated, operation 320 serves to retrieve and store the values of the time-variant variables at a particular moment in time, and the latest such stored values can be deemed to be the latest snapshot (e.g., a second snapshot), and the saved values from an earlier snapshot can be deemed an earlier snapshot (e.g., a first snapshot). Thus, operation 510 serves to retrieve the latest snapshot of the time-variant variables, and operation 520 serves to retrieve an earlier snapshot. The retrievals of operation 510 and operation 520 support comparisons of each individual time-variant variables by comparing the latest value to an earlier value (see operation 540). In some embodiments, the comparisons are stored in non-volatile memory for subsequent steps and/or iterations (see operation 550). Or, in some cases, the comparisons are passed in memory for use by subsequent steps and/or iterations.

Figure 6:
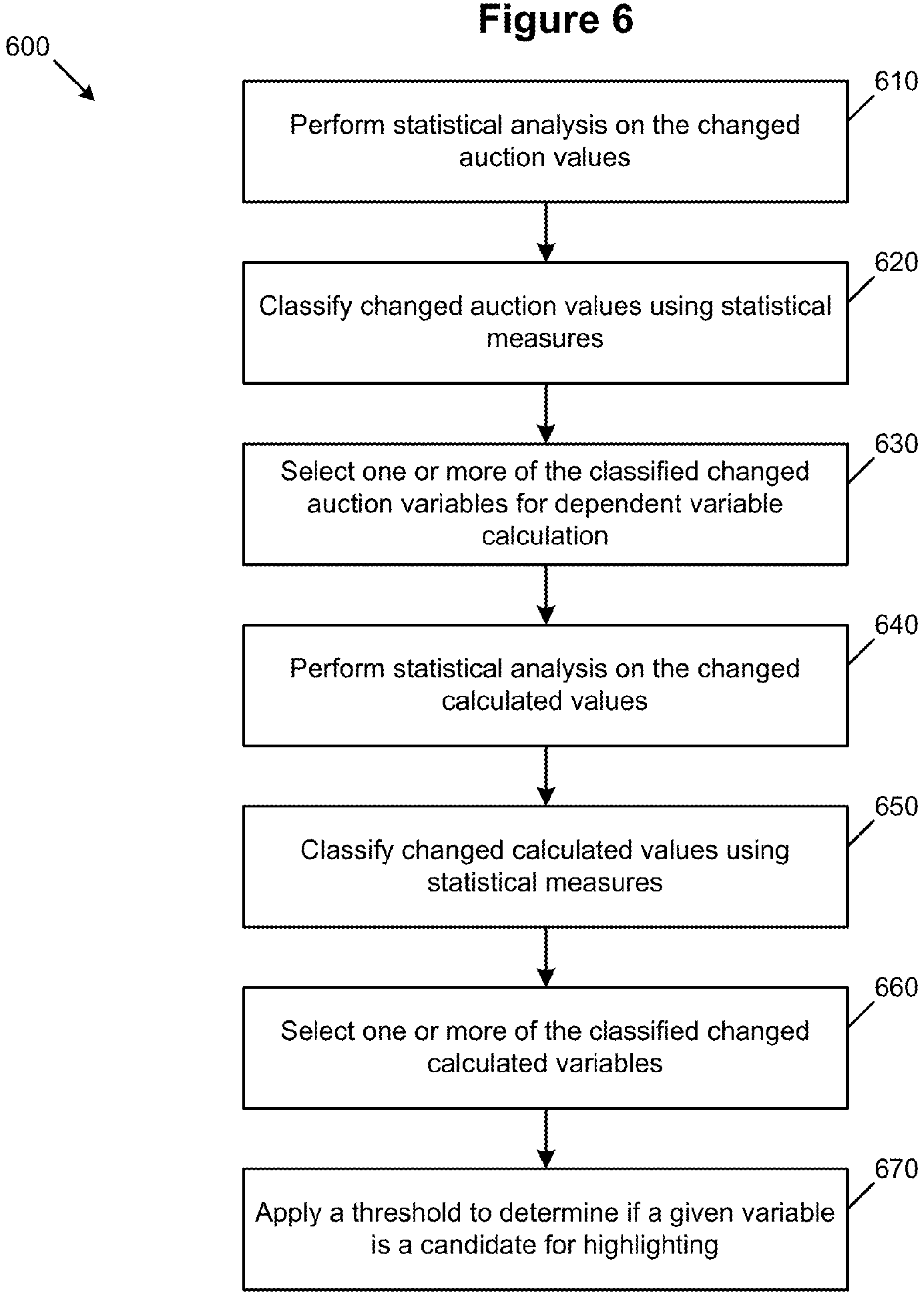
FIG. 6 is a flowchart of operations to select one or more changes as candidates for highlighting using graphic interpretive data change indicators, according to some embodiments.

FIG. 6 is a flowchart of operations 600 to select one or more changes as candidates for highlighting using graphic interpretive data change indicators, according to some embodiments. As has been discussed above, in fast paced real-time auctions, it becomes very difficult for a user 105 (e.g., a buyer) to absorb the fast-changing values (e.g., the changes to auction variables such as incoming bids) and assess their impact to the organization and to the supplier selection process. Therefore, within the context of a dynamic auction monitor with graphic interpretive data change indicators, various techniques are employed to minimize the extent of changes highlighted or emphasized on the auction monitor display 122. For example, given a delivery date promised by a supplier, if the promised date is changed, and the change is within a given range (e.g., less than an hour), then don't highlight the change. Or, given an auction variable indicating a particular bid quantity to be delivered, if the new bid quantity is within (for example) 0.01% of the previous bid quantity to be delivered, then don't highlight the change.

Accordingly, the auction variables are monitored over time (e.g., an earlier set of auction variables are compared to a later set of auction variables) and when changes are detected in one or more of the compared instances of auction variables, and a set of candidate changed auction variables is created for further processing. However, some of the candidate changed auction variables might be changed by a lot (requiring one sort of further processing) and some candidate changed auction variables might be changed by only a little (requiring a different sort of further processing). As an example, there is a class of changes to auction variables that have low impact to the status of the auction. And there is a class of changes to auction variables that can be classified as phantom changes, and unless filtered, might result in undesired change indications. For example, a time-variant auction variable (e.g., a bid price) might have been changed by a supplier, yet the change to the variable might have been so small as to be numerically insignificant (e.g., a bid change from $1.00 to $1.001), or too small to display (e.g., if the display were in whole dollars rather than in dollars and cents). Or, a time-variant variable (e.g., a bid price) might have been changed by a supplier to indicate a different direction of change (e.g., from $0.99 to $1.00 and then back to $0.99), yet the change is so small as to be deemed negligible, and should not be highlighted as a change.

As another example, a group of suppliers might be changing their bids over a wide range, such as by many percentage points or more; yet one particular supplier is concurrently changing their bid in a very narrow, possibly numerically insignificant range. In such a case, that narrowly changed bid has a low impact to the status of the auction, and should be filtered from the set of variable selected for highlighting. There are many techniques applicable in order to determine the significance of a change in relation to other changes. One possible technique is to obtain a statistical measure via application of one or more statistical analysis techniques to compare changed variables. Referring again to the example of a small bid change in the face of many other much larger bid changes, a histogram or other distribution of the changes can be calculated, and (for example) if the small change is smaller than (for example) two sigma standard deviation from the norm, then the small change is a candidate for filtering.

Referring again to the flowchart of operations 600 to select one or more changes as candidates for highlighting, the operation 610 serves to perform statistical analysis on the changed auction values, and to use the results of such statistical analysis on the changed auction values to classify the changed auction values (see operation 620). Such a classification might be in the form of classifying into statistical ranges, such as one-sigma, two-sigma, etc. Or a classification might include qualitative assessment, such as 'nuisance', 'negligible', 'important', 'critical', etc. Having classified the changed values, some of the changed variables are selected for use in calculating dependent variables. For example, a numeric change to an offer price has a numeric impact to the total cost over all units ordered in the line. However, it is possible that such a change to an offer to sell price does not have a displayable impact to the total cost over all units ordered in the line. The operation 630 exemplifies one technique where changes classified as negligible do not cause recalculation of dependent variables, thus the dependent variables are unchanged in this iteration and are not highlighted in the emphasized auction monitor display 180.

On the other hand, changed auction variables flowed to recalculated dependent variables (e.g., changed calculated variables 186) might indeed be so significant as to warrant being highlighted in the emphasized auction monitor display 180. Operation 640 serves to perform statistical analysis on the changed calculated variables, and operation 650 serves to classify changed calculated variables using statistical measures, again to determine a quantitative and/or qualitative assessment in order to deem the change to be significant enough as to be selected as a candidate for being highlighted in the emphasized auction monitor display 180 (see operation 660).

Operation 630 and operation 660 are similar in the regard that both operations select candidates for being highlighted in the emphasized auction monitor display 180. However, yet another filter might be applied, and such an additional filter can be implemented in the form of a threshold (see operation 670). Of course, a threshold can be implemented according to many techniques, including a raw numeric threshold, a percentage threshold, or a moving average threshold, to name a few. Operation 670 serves to apply a threshold to determine if a given variable (e.g., a changed auction variable, or a changed calculated variable, etc.) is to be highlighted or otherwise emphasized.

Figure 7:
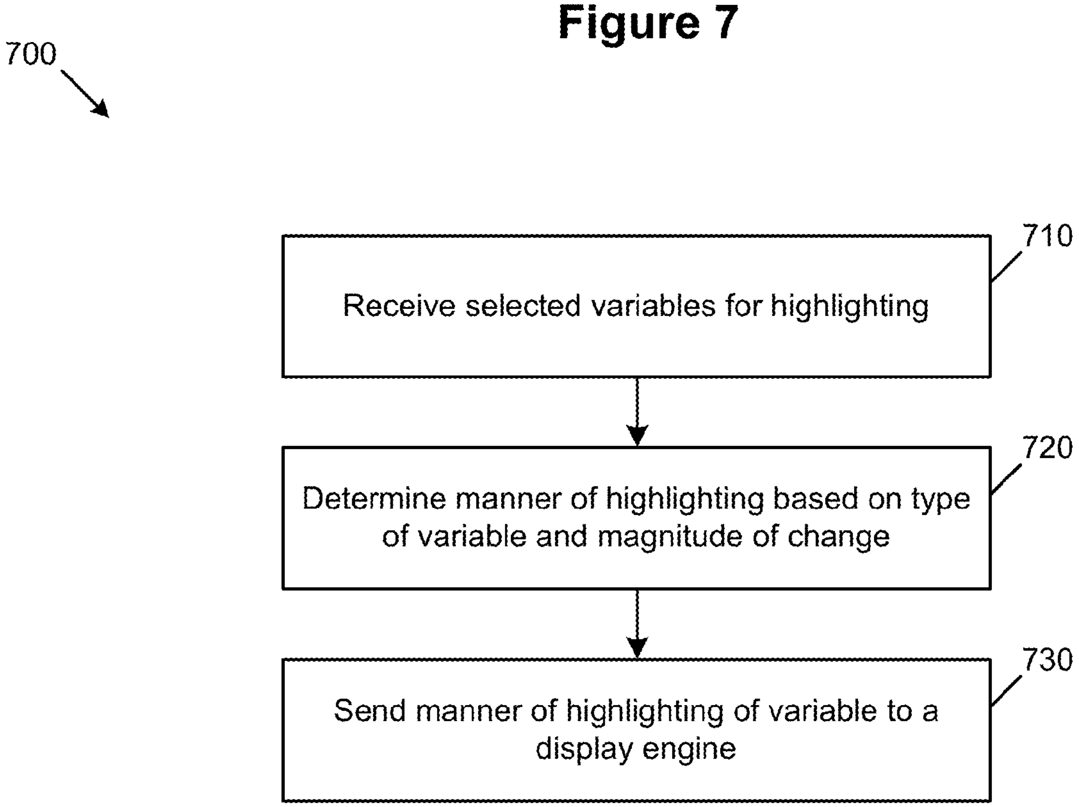
FIG. 7 is a flowchart of operations to determine the manner of highlighting using graphic interpretive data change indicators, according to some embodiments.

FIG. 7 is a flowchart of operations 700 to determine the manner of highlighting using graphic interpretive data change indicators. Certain operations of FIG. 6 determine if a given variable (e.g., a changed auction variable, or a changed calculated variable, etc.) is to be highlighted or otherwise emphasized in the auction monitor display 122. If there are such variables to be highlighted, then operation 710 serves to receive them, and operation 720 serves to determine the manner of highlighting to be used based on the type of the variable and magnitude of the change. For example, when a bid amount changes, a screen device (e.g., an up/down arrow icon) indicates the direction of change, and the color of the screen device (e.g., green or red) interprets whether the change was favorable or unfavorable. Operation 720 can determine the manner of emphasis by making use of a function or table; an example of such a table is given in Table 3.

TABLE 3

| Manner of Emphasis | |
|---|---|
| Characteristics of Change | Manner of Emphasis |
| Bid Amount Increase | Present green up arrow |
| Bid Amount Decrease | Present red down arrow |
| Rank Increased | Present green up arrow |
| Rank Decreased | Present red down arrow |
| Bid Amount Increase | Plot green data point on trend line |
| Bid Amount Decrease | Plot red data point on trend line |
| Increase/Decrease of a Magnitude | Present the changed value(s) with a larger/smaller indicator (e.g. a larger/smaller screen device) |

Of course, the aforementioned function or table can involve additional processing beyond a mere lookup in a table, and might include temporal considerations, or biasing toward showing changes using visually aesthetic techniques such as smooth movement, fade-in and dissolve techniques, movement of bars in bar charts, etc. And, any such determinations of manner of emphasis can be sent to cooperating system components (e.g., the presentation emphasis engine 128) in preparation for rendering and display (see operation 730).

Figure 8A:
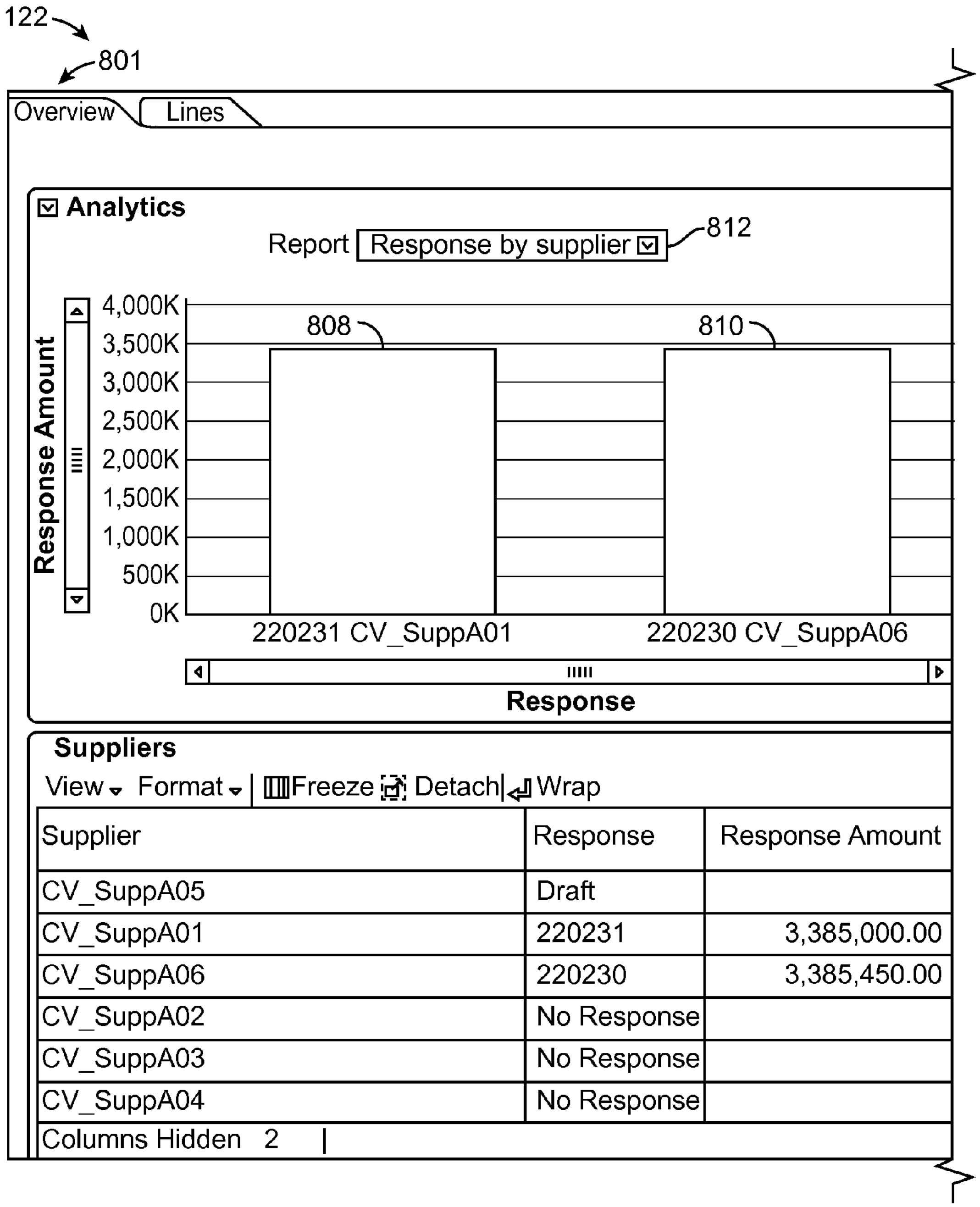
FIG. 8A illustrates an auction monitor display showing selected areas subject to emphasis to indicate changed auction data, according to some embodiments.
Figure 8A:
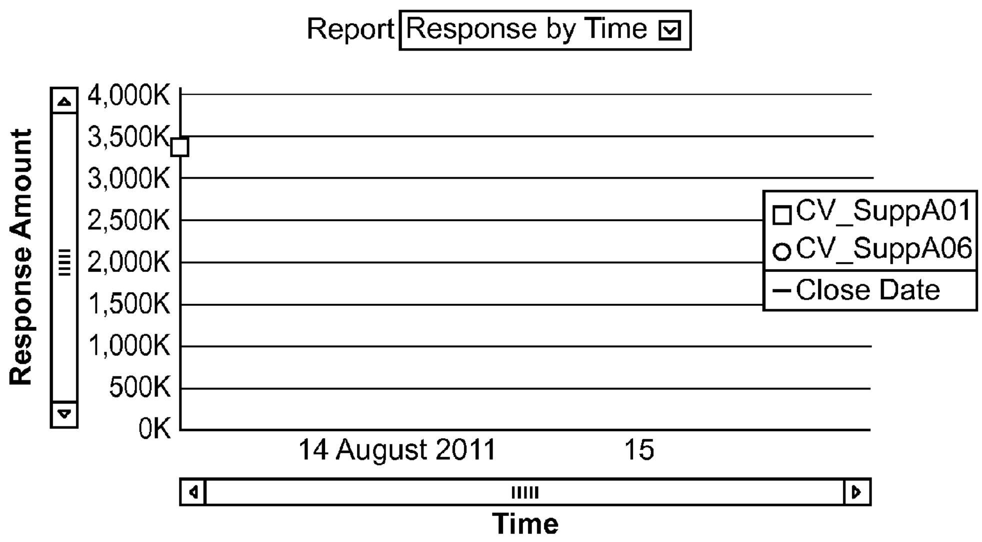

FIG. 8A illustrates an auction monitor display 122 showing selected areas subject emphasis to indicate changed auction data. As shown, the auction monitor display 122 shows a set of auction variables in a condition to be highlighted with interpretive data change indicators for display using a second set of auction variables and graphic data change indicators. For example, auction monitor display 122 shows an overview tab (see overview tab 801), which in turn shows a particular set of auction variables (e.g., responses by supplier 812) in graphical form. In this example, the graphical form renders a bar chart having a "CV_SuppA01" response amount 808 and a "CV_SuppA06" response amount 810. Also shown is a screen device in the form of a table depicting a column for variance from previous response 802, a column for savings percentage 804, and the time of response 806. Some selected areas of auction monitor display 122 are subject to emphasis in order to indicate changed auction data in real time. Exemplary emphasis is presented in FIG. 8B.

Figure 8B:
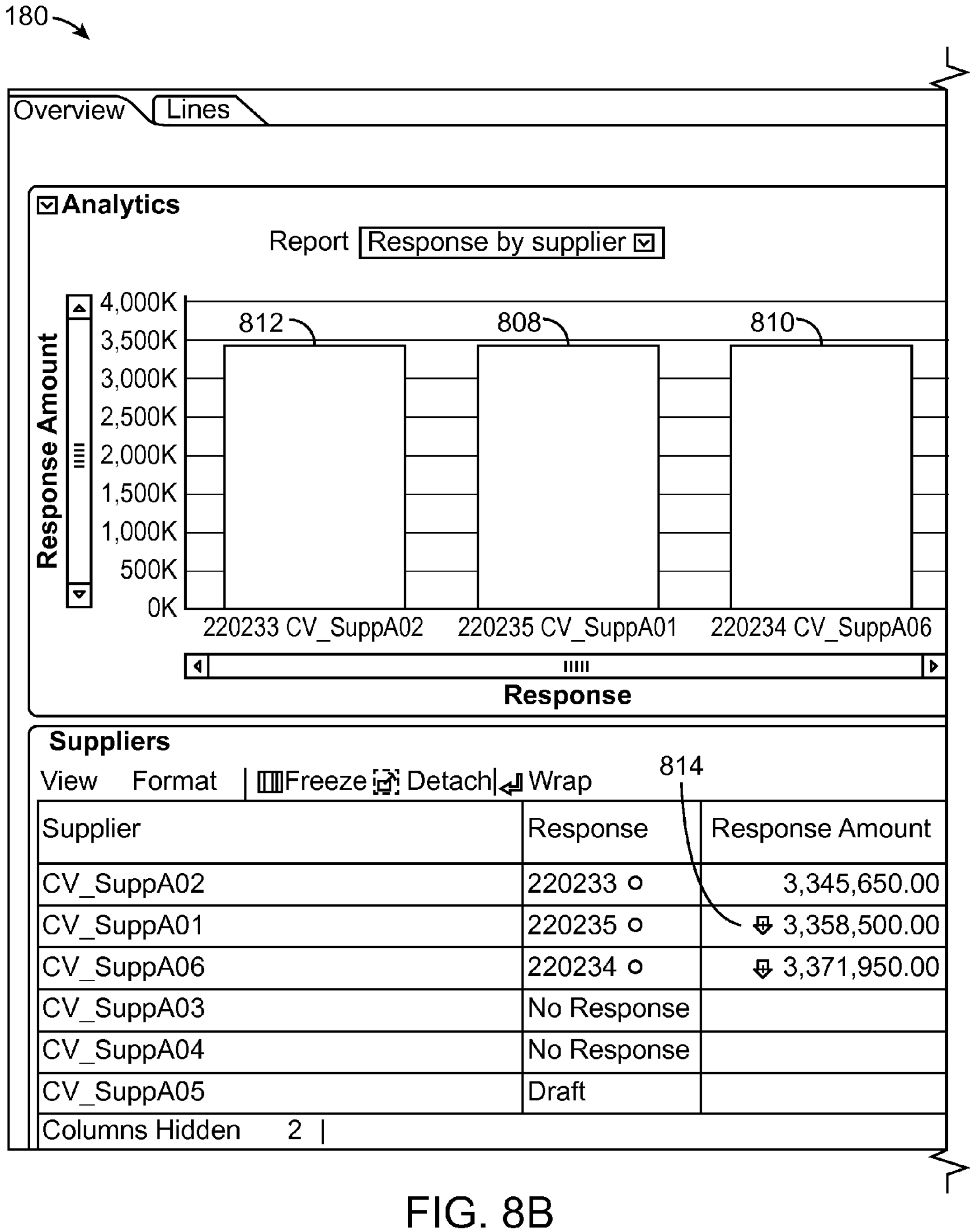
FIG. 8B illustrates an emphasized auction monitor display showing selected areas of emphasis to indicate changed auction data, according to some embodiments.
Figure 8B:
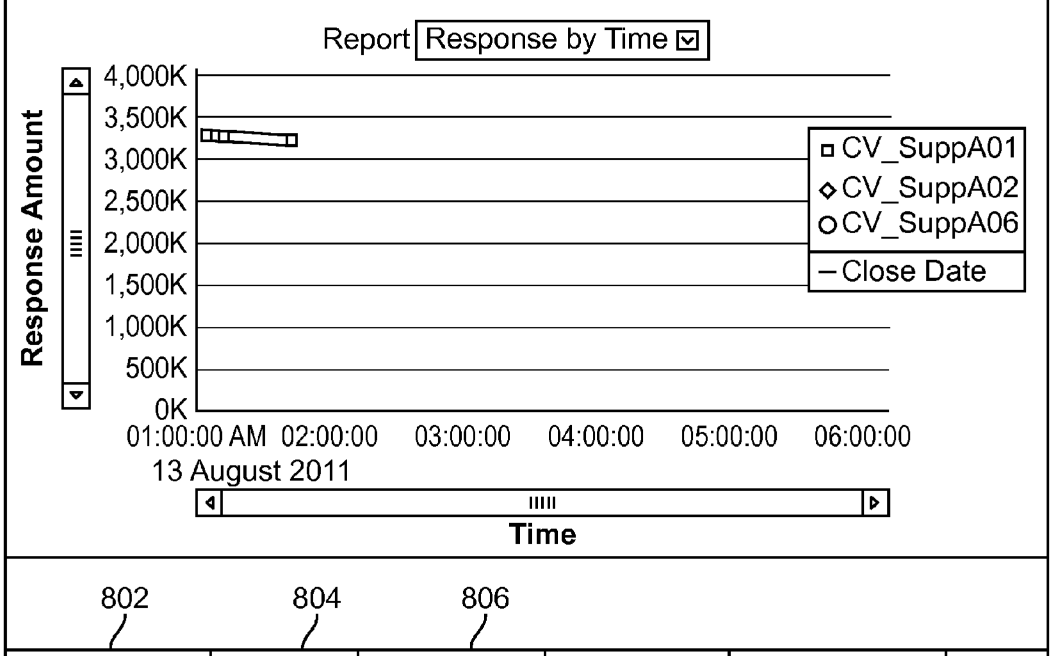

FIG. 8B illustrates an emphasized auction monitor display 180 showing selected areas of emphasis to indicate changed auction data. In addition to the introduction of "CV_SuppA02" response amount, the screen device in the form of a table shows new entries, namely the entries for "CV_SuppA06". And, the response amounts for "CV_SuppA01" and "CV_SuppA06" were changed, so those entries in the table are shown as emphasized using response amount change arrows 814. Change arrows corresponding to calculated changed variables are also shown in the column for savings percentage 804. As shown, wherever the bid amount (e.g., response amount) was decreased (and emphasized with a down arrow) the corresponding value in the column for savings percentage 804 is increased (and emphasized with an up arrow).

Figure 9:
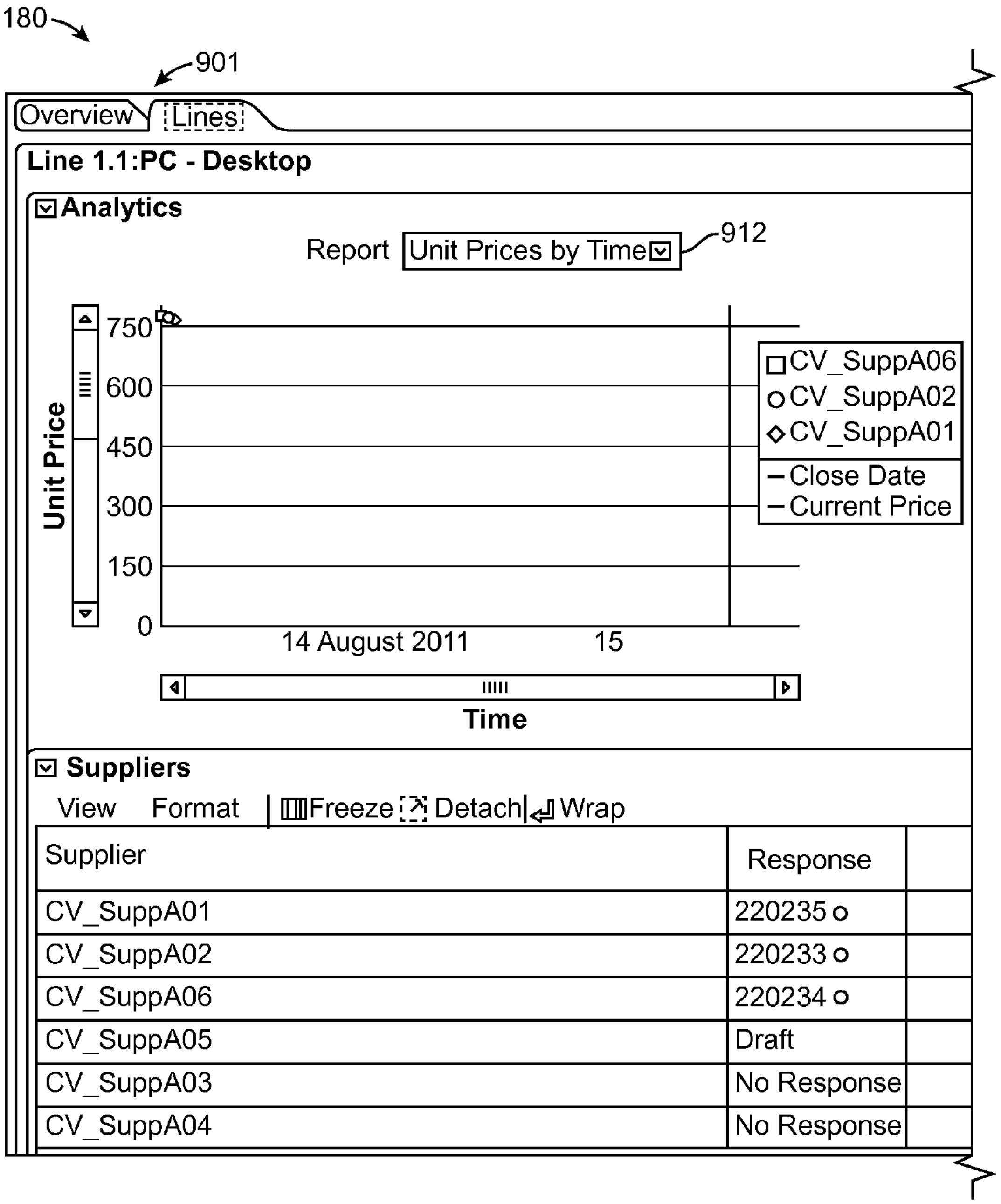
FIG. 9 illustrates an emphasized auction monitor display showing other selected areas of emphasis to indicate changed auction data, according to some embodiments.
Figure 9:
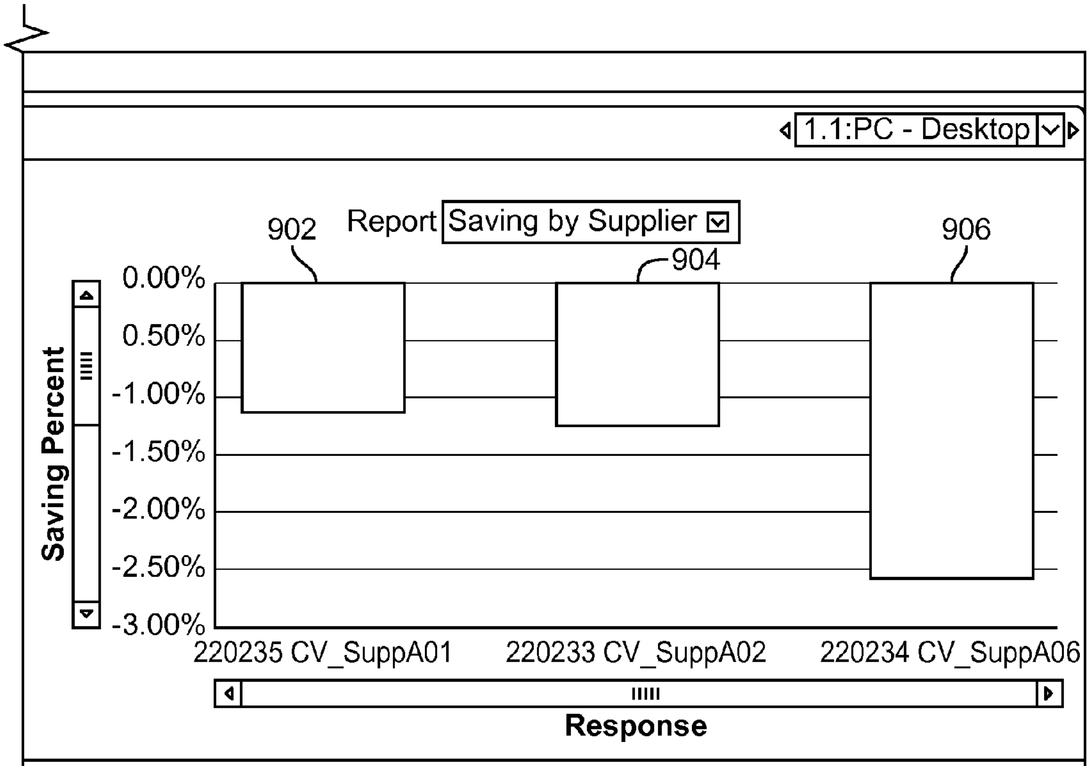

FIG. 9 illustrates an emphasized auction monitor display 180 showing selected areas of emphasis to indicate changed auction data. The rendering of FIG. 8A and FIG. 8B are merely examples, and a wide variety of renderings are possible. As a further example, the emphasized auction monitor display 180 shows a tab for "lines" (see lines tab 901), and auction variables in the form of unit prices by time 912 are presented. Also shown are entries in a bar chart, showing decreases for the suppliers (see decrease savings by supplier for "CV_SuppA01" 902, decrease savings by supplier for "CV_SuppA02" 904, ad decrease savings by supplier for "CV_SuppA06" 906. Such entries in a bar chart can be emphasized using a screen device.

Figure 10:
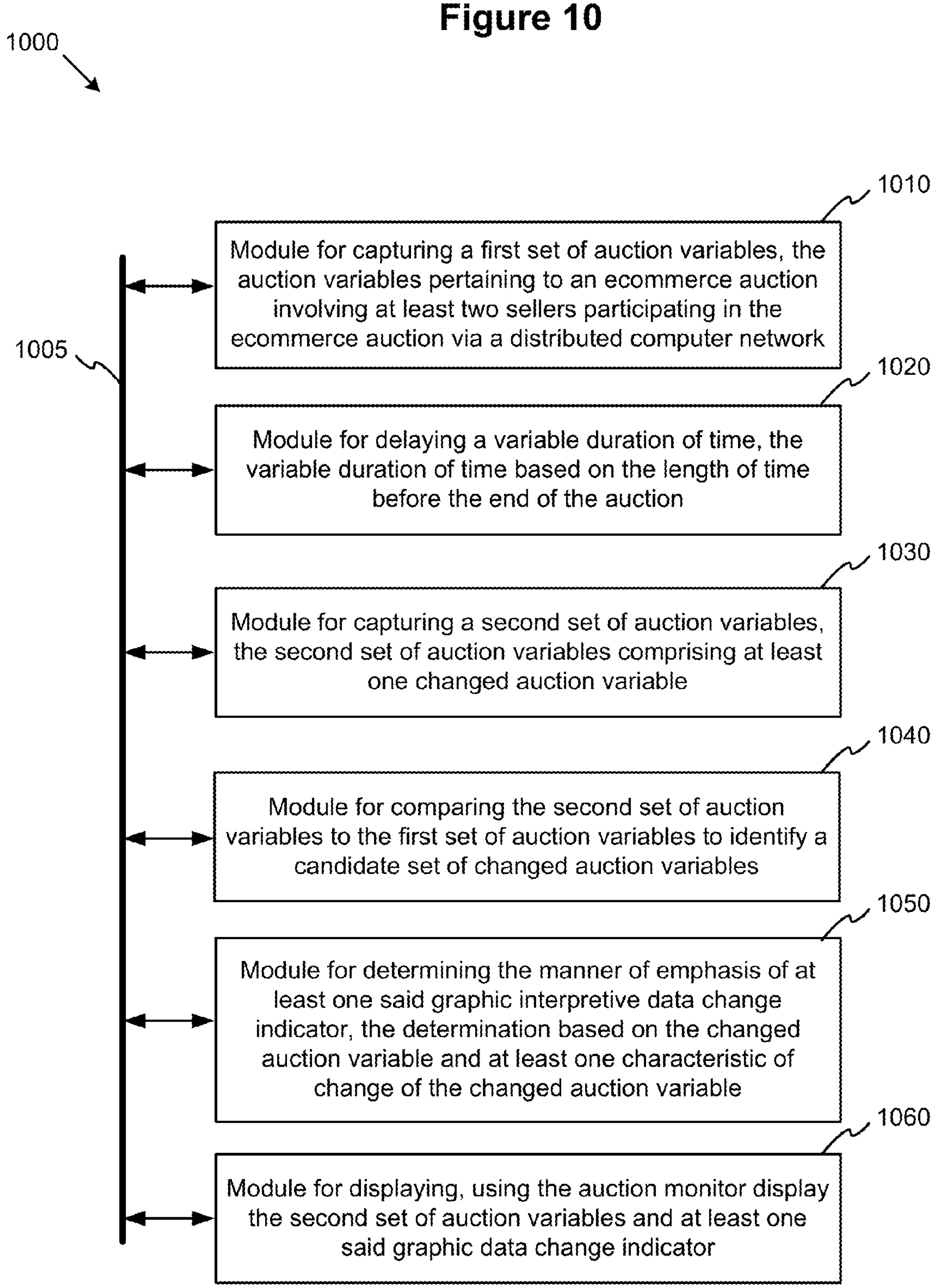
FIG. 10 depicts a block diagram of a system for updating an auction monitor display with graphic data change indicators, according to some embodiments.

FIG. 10 depicts a block diagram of a system for updating an auction monitor display with graphic data change indicators. As an option, the present system 1000 may be implemented in the context of the architecture and functionality of the embodiments described herein. Of course, however, the system 1000 or any operation therein may be carried out in any desired environment. As shown, system 1000 comprises a plurality of modules, a module comprising at least one processor and a memory, each connected to a communication link 1005, and any module can communicate with other modules over communication link 1005. The modules of the system can, individually or in combination, perform method steps within system 1000. Any method steps performed within system 1000 may be performed in any order unless as may be specified in the claims. As shown, system 1000 implements a method for updating an auction monitor display with graphic data change indicators, the system 1000 comprising modules for: capturing a first set of auction variables, the auction variables pertaining to an ecommerce auction involving at least two sellers participating in the ecommerce auction via a distributed computer network (see module 1010); delaying a variable duration of time, the variable duration of time based on the length of time before the end of the auction (see module 1020); capturing a second set of auction variables, the second set of auction variables comprising at least one changed auction variable (see module 1030); comparing the second set of auction variables to the first set of auction variables to identify a candidate set of changed auction variables (see module 1040); determining the manner of emphasis of at least one the graphic data change indicator, the determination based on the changed auction variable, and at least one characteristic of change of the changed auction variable (see module 1050); and displaying, using the auction monitor display the second set of auction variables and at least one the graphic data change indicator (see module 1060).

System Architecture Overview

Figure 11:
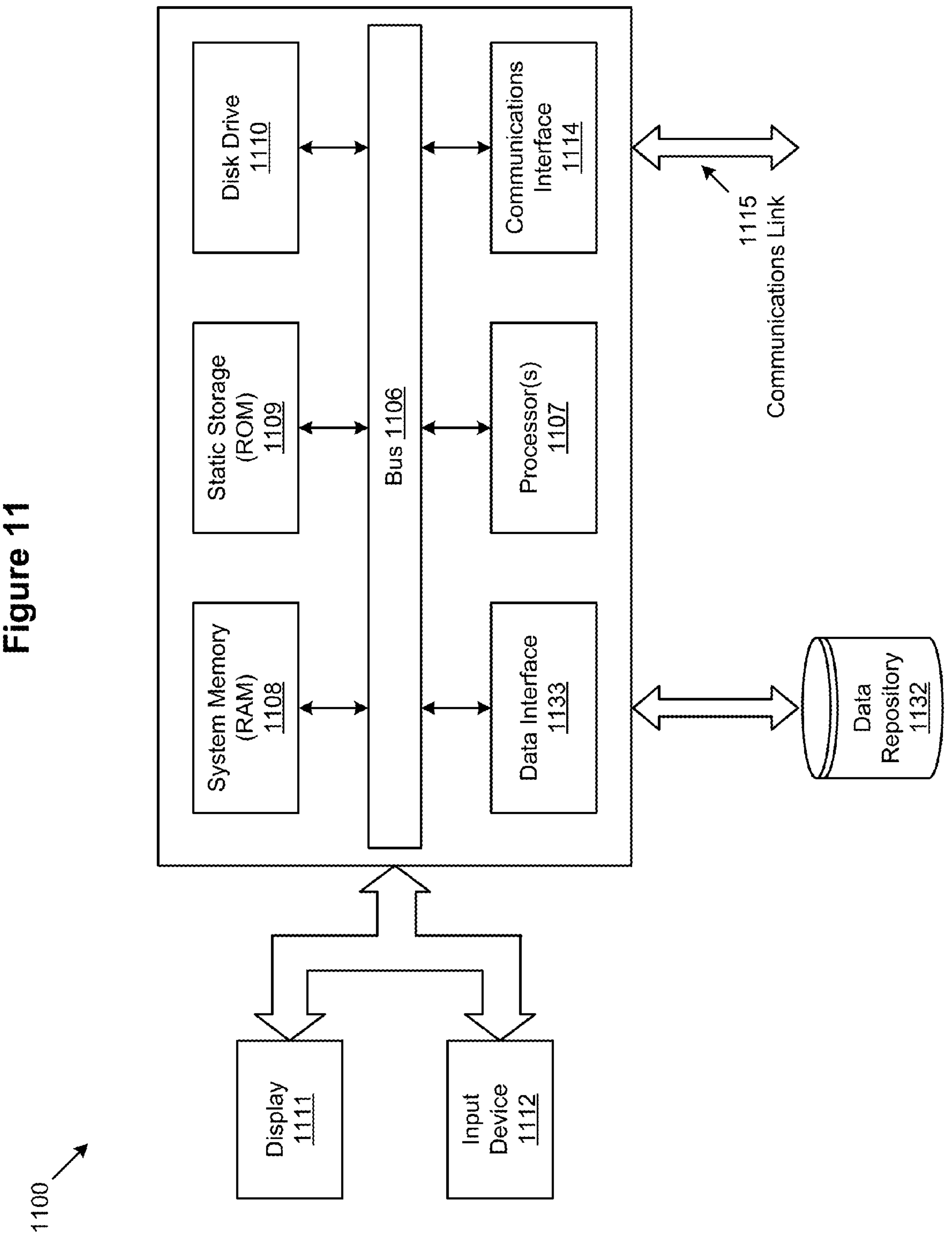
FIG. 11 illustrates a computer system on which an embodiment of the claims can be implemented.

FIG. 11 depicts a block diagram of an instance of a computer system 1100 suitable for implementing an embodiment of the present disclosure. Computer system 1100 includes a bus 1106 or other communication mechanism for communicating information, which interconnects subsystems and devices, such as a processor 1107, a system memory 1108 (e.g., RAM), a static storage device 1109 (e.g., ROM), a disk drive 1110 (e.g., magnetic or optical), a data interface 1133, a communications interface 1114 (e.g., modem or Ethernet card), a display 1111 (e.g., CRT or LCD), input devices 1112 (e.g., keyboard, cursor control), and an external data repository 1132.

According to one embodiment of the disclosure, computer system 1100 performs specific operations by processor 1107 executing one or more sequences of one or more instructions contained in system memory 1108. Such instructions may be read into system memory 1108 from another computer readable/usable medium, such as a static storage device 1109 or a disk drive 1110. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1107 for execution. Such a medium may take many forms, including but not limited to, non-volatile media and volatile media. Non-volatile media includes, for example, optical or magnetic disks, such as disk drive 1110. Volatile media includes dynamic memory, such as system memory 1108.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single computer system 1100. According to other embodiments of the disclosure, two or more computer systems 1100 coupled by a communication link 1115 (e.g., LAN, PTSN, or wireless network) may perform the sequence of instructions required to practice the disclosure in coordination with one another.

Computer system 1100 may transmit and receive messages, data, and instructions, including program, i.e., application code, through communication link 1115 and communications interface 1114. Received program code may be executed by processor 1107 as it is received, and/or stored in disk drive 1110 or other non-volatile storage for later execution.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A computer implemented method for updating an auction monitor display with graphic data change indicators, the method comprising:

capturing a first set of variables that pertains to an online auction having a plurality of online auction participants at a first time via a distributed computer network;

automatically adjusting a dynamically adjustable temporal duration between capturing two consecutive sets of variables based in part or in whole upon one or more criteria;

capturing a second set of variables comprising at least one changed variable at a second time that is determined based at least in part upon the dynamically adjustable temporal duration and the first time;

identifying one or more differences greater than a specified threshold between the first set and the second set of variables at least by comparing the second set of variables to the first set of variables;

identifying, at a threshold module stored at least partially in memory of and functioning in conjunction with a computing system, one or more selected variables corresponding to the one or more differences from the first set and the second set of variables for emphasis by using at least the specified threshold to reduce usage of one or more computing resources of the computing system;

identifying, for the one or more selected variables, one or more graphic data change indicators that indicate a direction of change of the one or more selected variables;

determining, for the one or more selected variables, a manner of emphasis for one or more graphic data change indicators; and displaying, using the auction monitor display, at least the one or more selected variables in conjunction with the one or more graphic data change indicators.

2. The method of claim 1, wherein the first set of variables comprises at least one dependent variable.

3. The method of claim 1, further comprising delaying capturing the second set of variables by the dynamically adjustable temporal duration from capturing the first set of variables, wherein the one or more criteria comprise a first temporal period from a beginning of the online auction, a second temporal period to a close of the online auction, a number of current online auction participants, a number of new online auction participants, one or more occurrences of online auction activities, or any combinations thereof.

4. The method of claim 1, wherein the specified threshold corresponds to a number of standard deviations.

5. The method of claim 1, wherein determining the manner of emphasis for the one or more graphic data change indicators includes a determination based at least on part on a magnitude of change of the one or more selected variables and a moving average.

6. The method of claim 1, further comprising:

identifying the time-variant variable at the second time;

determining whether the time-variant variable changes values between the first time and the second time;

identifying the time-variant variable into the one or more selected variable when the time-variant variable is determined to have changed the values between the first time and the second time;

applying the manner of emphasis to the time-variant variable;

identifying an insignificant variable having a first impact that is determined to be insignificant;

identifying one or more other variables that are affected by the insignificant variable;

determining a second impact of the insignificant variable on the one or more other variables;

determining whether the second impact of the insignificant variable on the one or more other variables is significant;

identifying the one or more other variables into the one or more selected variable when the second impact of the insignificant variable on the one or more other variables is determined to be significant although the first impact of the insignificant variable is determined to be insignificant;

identifying a calculated time-variant variable;

dynamically adjusting a value of the calculated time-variant variable a plurality of times during a period of time;

identifying the calculated time-variant variable into the one or more selected variable when the calculated time-variant variable is determined to have a significant impact;

applying the manner of emphasis to the calculated time-variant variable;

identifying a first time-invariant variable;

maintaining accessibility to the first time-invariant variable for an entire duration of the online auction;

identifying a second time-invariant variable;

rendering the second time-invariant variable inaccessible for portion of the entire duration of the online auction;

identifying a plurality of dynamically adjustable temporal durations between capturing the two consecutive sets of variables, the plurality of dynamically adjustable temporal durations comprising the dynamically adjustable temporal duration between capturing the first set and the second set of variables;

determining a first period of time till a close of the online auction based on a current time;

adjusting one or more dynamically adjustable temporal durations based in part or in whole upon the first time period;

identifying a number of online auction buyer participants participating in the online auction;

adjusting one or more dynamically adjustable temporal durations based in part or in whole upon the number of buyer participants and the plurality of online auction participants;

identifying a number of auction activities from online auction buyer participants participating in the online auction;

adjusting one or more dynamically adjustable temporal durations based in part or in whole upon the number of auction activities from the online auction buyer participants;

identifying a number of online auction seller participants participating in the online auction;

predicting availability of second new information pertaining to the online auction based in part or in whole upon the number of seller participants and a previously known number of online auction sellers in the plurality of online auction participants; and adjusting at least one dynamically adjustable temporal duration based in part or in whole upon the availability of second new information pertaining to the online auction.

7. A computer system for updating an auction monitor display with graphic data change indicators, the computer system comprising:

a computer processor; and a memory to hold program instructions, the program instructions when executed by the computer processor, cause the computer processor to:

capture a first set of variables that pertains to an online auction having a plurality of online auction participants at a first time via a distributed computer network;

automatically adjust a dynamically adjustable temporal duration between capturing two consecutive sets of variables based in part or in whole upon one or more criteria;

capture a second set of variables comprising at least one changed variable at a second time that is determined based at least in part upon the dynamically adjustable temporal duration and the first time;

identify one or more differences greater than a specified threshold between the first set and the second set of variables at least by comparing the second set of variables to the first set of variables;

identify, at a threshold module stored at least partially in memory of and functioning in conjunction with a computing system, one or more selected variables corresponding to the one or more differences from the first set and the second set of variables for emphasis by using at least the specified threshold to reduce usage of one or more computing resources of the computing system;

identify, for the one or more selected variables, one or more graphic data change indicators that indicate a direction of change of the one or more selected variables;

determine, for the one or more selected variables, a manner of emphasis for one or more graphic data change indicators; and display, using the auction monitor display, at least the one or more selected variables in conjunction with the one or more graphic data change indicators.

8. The computer system of claim 7, wherein the first set of variables comprises at least one dependent variable.

9. The computer system of claim 8, further comprising the program instructions which, when executed by the computer processor, cause the computer processor further to delaying capturing the second set of variables by the dynamically adjustable temporal duration from capturing the first set of variables, wherein the one or more criteria comprise a first temporal period from a beginning of the online auction, a second temporal period to a close of the online auction, a number of current online auction participants, a number of new online auction participants, one or more occurrences of online auction activities, or any combinations thereof.

10. The computer system of claim 8, wherein the specified threshold corresponds to a number of standard deviations.

11. The computer system of claim 8, wherein the program instructions which, when executed by the computer processor, cause the computer processor further to determine the manner of emphasis for the one or more graphic data change indicators further includes additional program instructions for a determination based at least on part on a magnitude of change of the one or more selected variables.

12. The computer system of claim 8, wherein the program instructions which, when executed by the computer processor, cause the computer processor to determine the manner of emphasis for the one or more graphic data change indicators further includes additional program instructions for a determination based at least on part on a moving average.

13. A computer program product embodied in a non-transitory computer readable storage medium, the non-transitory computer readable storage medium having stored thereon a sequence of instructions which, when executed by a processor causes the processor to execute a set of acts for updating an auction monitor display with graphic data change indicators, the set of acts comprising:

capturing a first set of variables that pertains to an online auction having a plurality of online auction participants at a first time via a distributed computer network;

automatically adjusting a dynamically adjustable temporal duration between capturing two consecutive sets of variables based in part or in whole upon one or more criteria;

capturing a second set of variables comprising at least one changed variable at a second time that is determined based at least in part upon the dynamically adjustable temporal duration and the first time;

identifying one or more differences greater than a specified threshold between the first set and the second set of variables at least by comparing the second set of variables to the first set of variables;

identifying, at a threshold module stored at least partially in memory of and functioning in conjunction with a computing system, one or more selected variables corresponding to the one or more differences from the first set and the second set of variables for emphasis by using at least the specified threshold to reduce usage of one or more computing resources of the computing system;

identifying, for the one or more selected variables, one or more graphic data change indicators that indicate a direction of change of the one or more selected variables;

determining, for the one or more selected variables, a manner of emphasis for one or more graphic data change indicators; and displaying, using the auction monitor display, at least the one or more selected variables in conjunction with the one or more graphic data change indicators.

14. The computer program product of claim 13, wherein the first set of variables comprises at least one dependent variable.

15. The computer program product of claim 13, further comprising delaying capturing the second set of variables by the dynamically adjustable temporal duration from capturing the first set of online variables duration from capturing the first set of variables, wherein the one or more criteria comprise a first temporal period from a beginning of the online auction, a second temporal period to a close of the online auction, a number of current online auction participants, a number of new online auction participants, one or more occurrences of online auction activities, or any combinations thereof.

16. The computer program product of claim 15, wherein the specified threshold corresponds to a number of standard deviations.

17. The computer program product of claim 15, wherein determining the manner of emphasis for the one or more graphic data change indicators includes a determination based at least on part on a magnitude of change of the one or more selected variables.

* * * * *

UNITED STATES PATENT AND TRADEMARK OFFICE

CERTIFICATE OF CORRECTION

PATENT NO. : 9,495,702 B2
APPLICATION NO. : 13/237853
DATED : November 15, 2016
INVENTOR(S) : Srivastava et al.

It is certified that error appears in the above-identified patent and that said Letters Patent is hereby corrected as shown below:

In the Drawings

On sheet 14 of 18, in FIG. 8B (Cont.), Line 21, delete “Creat” and insert -- Create --, therefor.

In the Claims

In Column 15, Line 8, in Claim 6, after “comprising:” insert -- identifying a time-variant variable at the first time; --.

In Column 16, Line 61, in Claim 9, delete “claim 8,” and insert -- claim 7, --, therefor.

In Column 17, Line 5, in Claim 10, delete “claim 8,” and insert -- claim 7, --, therefor.

In Column 17, Line 7, in Claim 11, delete “claim 8,” and insert -- claim 7, --, therefor.

In Column 17, Line 14, in Claim 12, delete “claim 8,” and insert -- claim 7, --, therefor.

In Column 18, Line 34, in Claim 16, delete “claim 15,” and insert -- claim 13, --, therefor.

In Column 18, Line 37, in Claim 17, delete “claim 15,” and insert -- claim 13, --, therefor.

Signed and Sealed this
Thirteenth Day of June, 2017

Joseph Matal

Joseph Matal
*Performing the Functions and Duties of the*
*Under Secretary of Commerce for Intellectual Property and*
*Director of the United States Patent and Trademark Office*